(12) United States Patent
Bhansali et al.

(10) Patent No.: US 12,493,603 B2
(45) Date of Patent: Dec. 9, 2025

(54) SYSTEM CONFIGURED WITH AN EVER EXPANDING, SELF-CALIBRATING, ARRAY OF ONE OR MORE TYPES OF ATTRIBUTES

(71) Applicant: SMUDG COMPANY PTE. LTD., Singapore (SG)

(72) Inventors: Juilee Bhansali, Mumbai (IN); Sanand Sule, Pune (IN)

(73) Assignee: SMUDG COMPANY PTE. LTD., Singapore (SG)

( * ) Notice: Subject to any disclaimer, the term of this patent is extended or adjusted under 35 U.S.C. 154(b) by 0 days.

(21) Appl. No.: 18/882,692

(22) Filed: Sep. 11, 2024

(65) Prior Publication Data

US 2025/0005011 A1    Jan. 2, 2025

Related U.S. Application Data

(63) Continuation of application No. PCT/SG2023/050158, filed on Mar. 11, 2023.

(30) Foreign Application Priority Data

Mar. 11, 2022 (SG) ............................ 10202202520V

(51) Int. Cl.
*G06F 16/22* (2019.01)
(52) U.S. Cl.
CPC ...... *G06F 16/2282* (2019.01); *G06F 16/2237* (2019.01)

(58) Field of Classification Search
CPC .. G06F 16/2282; G06F 16/2237; G06N 20/00
USPC ........................................................ 707/803
See application file for complete search history.

(56) References Cited

U.S. PATENT DOCUMENTS

| 9,760,802 B2 | 9/2017 | Chen et al. | |
| 10,210,236 B2 * | 2/2019 | Procops | G06F 16/148 |
| 2014/0280952 A1 * | 9/2014 | Shear | H04L 63/10 709/226 |
| 2021/0326782 A1 | 10/2021 | Achin et al. | |

OTHER PUBLICATIONS

WIPO, Written Opinion in corresponding PCT Application PCT/SG2023/050158, Aug. 7, 2023.
WIPO, International Search Report in corresponding PCT Application PCT/SG2023/050158, Aug. 7, 2023.

(Continued)

*Primary Examiner* — Hung T Vy
(74) *Attorney, Agent, or Firm* — Alley IP

(57) ABSTRACT

This invention discloses a system configured with an ever expanding, self-calibrating, array of one or more types of attributes, said system comprising: creating a first n-dimensional attribute matrix having a plurality of a first set of blocks, each block, from the first set of blocks, having a product data item resident; creating a second n-dimensional identity matrix having a plurality of second set of blocks, each block, from the second set of blocks, having a user data item resident; determining spatial extrapolation between vectors; receiving a new product data item; intelligently mapping each of said new product data items; intelligently locating each of said new product data items.

16 Claims, 12 Drawing Sheets

(56) References Cited

OTHER PUBLICATIONS

Uriel Singer et al., "Sequential Modeling with Multiple Attributes for Watchlist Recommendation in E-Commerce", arXiv, Oct. 24, 2021, pp. 1-10.
Anand Shanker Tewari et al., "Sequencing of items in personalized recommendations using multiple recommendation techniques" Expert Systems with Applications, vol. 97, May 1, 2018, pp. 70-82.
Yonghong Yu et al., "Attributes Coupling based Item Enhanced Matrix Factorization Technique for Recommender Systems", arXiv, May 5, 2014, oo. 1-13.

* cited by examiner

SYSTEM CONFIGURED WITH AN EVER EXPANDING, SELF-CALIBRATING, ARRAY OF ONE OR MORE TYPES OF ATTRIBUTES

RELATED APPLICATIONS

This application claims priority under 35 U.S.C. § 120 to, and is a continuation of, co-pending International Application PCT/SG2023/050158, filed Mar. 11, 2023 and designating the US, which claims priority to SG application Ser. No. 10/202,202520V, filed Mar. 11, 2022, such SG Application also being claimed priority to under 35 U.S.C. § 119. These SG and International applications are incorporated by reference herein in their entireties.

FIELD

This invention relates to the field of artificial intelligence, machine learning, computational networks, and computer engineering. Particularly, this invention relates to a system configured with an ever expanding, self-calibrating, array/matrix of one or more types of attributes.

BACKGROUND

In the world of beauty and fashion, make-up products make an infinite market what with a variety of products. Products define data, users define data, and experts define data; all of which are crucial for defining a 'product-user-fit'.

The inventors observed that, in the prior art, there were mere product recommendations which were linear product recommendations. However, these recommendations, apart from being static, never allowed for change basis user feedback and/or expert feedback.

Therefore, the inventors realised a need for accounting for a variety of biases; based on feedback and a variety of nodes. However, this meant building, and fitting product data, into an array/matrix which:
  was not linearly correlational on one or two static parameters;
  was expandable in terms to account of ever-increasing parameters;
  was non-linear.

Thus, the inventors realised a need for developing a multi-modal engine to arrive at an ever-expanding array/matrix of data correlating with 'product-user-fit'; in a non-linear fashion.

Global cosmetic products market was valued at around USD 532 billion in 2017 and is expected to reach approximately USD 863 billion in 2024, growing at a CAGR of 7%.

On the upside side, that are a lot more of beauty launches, a lot more of makeup purchases, and a lot more jobs created and a lot more increase in industry valuation. But between the million new products, over-the-top marketing campaigns, and a fragmented industry structure, for the casual beauty buyers, it can also mean:
  frustrating product searches;
  a huge post purchase dissonance; and
  ultimately low purchase motivation leading to extreme price sensitivity.

There is a need to orient a user, with repeated accuracy as well as considering a user profile, through this infinite maze of a market; hence, the need for an ever-expanding n-dimensional array/matrix of data correlating with 'product-user-fit'; in a non-linear fashion.

Therefore, the inventors realised a need for accounting for a variety of user profiles/user personas; based on self-evaluation parameters, based on expert-feedback parameters, based on pre-product-use parameters, based on post-product-use parameters, based on perception parameters, based on body scanning parameters, based on skin scanning parameters, based on skin testing parameters, and a variety of nodes. However, this meant building, and fitting user persona data, into an array/matrix which:
  was not linearly correlational on one or two static parameters;
  was expandable in terms to account of ever-increasing parameters;
  was non-linear.

Thus, the inventors realised a need for developing a multi-modal engine to arrive at an ever-expanding array/matrix of data correlating with 'user-persona-fit'; in a non-linear fashion.

Personalization, in beauty, is the future. However, a consumer is flummoxed by at least the following problems:

Problem #1: The Choice Paradox: In the market, there are too many products and, therefore, too much choice-which is not a bad thing, but when you think of a consumer, you can see how he/she could get affected. This leads to unplanned purchases (and returns), brand switching (no brand loyalty), price sensitivity (and deep price wars to poach a consumer), and buyer's remorse (and eventual lack of interest/joy in purchase).

Problem #2: The Herd Mentality: There are too many brands and marketplaces, and they continue to cater to only a percentage of buyers who are well informed and spend the most in this category. For other consumers, who just buy impulsively, these brands and marketplaces just sell, impulsively-no emotion, no customer connect, and no thought into what the consumer may want.

Problem #3: The Chaos Theory: The most searched queries, online, for 'makeup', involve 'how to' & 'what'.

While problems and solutions may seem random, if a pattern is mapped out in an artificially intelligent environment, dissonance seems to vanish and perfection of matching (and, user-profile-relevant repeatability) increases, voluminously. This can be achieved by creating an ever-expanding n-dimensional array/matrix of data correlating with 'product-user-fit'; in a non-linear fashion.

With the advent of personalization, every consumer is increasingly shifting away from the 'one size fits all' approach; they are looking for unique experiences, ways to fill the white space within store and retail experiences, increasing brand loyalty and customer retention. 'Customised and fulfilling experiences' is, therefore, an important criterion.

'Digitization' is key when it comes to creating consumer loyalty, engagement, and spend. It is important to create a fully personalized and fulfilling customer experience in store (online or offline), allowing targeted campaigns, segmented messaging, and personalized product recommendations based on factors such as the consumer's previous behaviour or location.

A recent survey found that 78% of millennial customers would be more inclined to purchase a makeup product if they could see what it looks like on their face prior to buying it. There is a need to provide address and predict a user's needs/wants/desires.

With the millennial consumer demanding convenience and instant information, digital channels and D2C, systems and methods are aimed towards providing an ideal platform for personalization and new opportunities to connect one-to-one with the consumer digitally.

A lot goes into a consumer's buying decision, with the millennial consumer scanning countless product reviews, ingredients lists, and influencer content before purchase, attempting to identify authentic and authoritative voices who can speak to their individual concerns.

There is a need to correctly guide consumers, with a fair degree of accuracy, and drive ecommerce engagement, with a fair degree of certainty; whilst accounting for the ever-expanding, multi-parameter-based, product data array/matrix and user-persona array/matrix. The data for this must be derived, with a confidence score, from an ever-expanding n-dimensional array/matrix of data correlating with 'product-user-fit' as well as with a 'user-persona-fit'; in a non-linear fashion.

The science of personalization is exploding, especially within areas of genetics, microbiome, and epigenetics, allowing personalization to reach new levels and enabling fully tailored beauty solutions to be recommended and formulated based upon the role of biomarkers and environmental factors in an individual's response to cosmetic ingredients.

Modern technological advances such as smart diagnostic devices and self-learning algorithms are driving personalization forward are enabling large scale data collection and analysis of individual consumer metrics and personalization at a mass scale.

There is a need to diminish the gap between a user's consonance and dissonance in relation to a product, in an online networked digital environment, in order to achieve a satisfactory output.

Therefore, cumulatively, there is a need for a system and method which matches a user's perceived look and/or attribute(s) with a product's actual attribute(s). In other words, there is a need for a system and method which predicts the gap between a user's actual look attributes and a buyer's perceived look attributes and, furthermore, predicts a product's described attribute(s) and a product's actual performance-based attribute(s) and, additionally, predicts a user's (who has used a product) perceived look attribute(s), perceived product attribute(s), the user's actual look attribute(s), and the user's actual look attribute(s).

In order to achieve this, datasets need to be built which segment data items in terms of attributes (vector+scalar), use biases to dope this segmented data items by external data items (biases), see how the biases' data items affect segments of the segmented data items—thereby, forming new data items, intelligently map the formed new data items correlative to the segmented data items, and intelligently located the formed new data items correlative to the segmented data items.

SUMMARY

An object of the invention is to provide a system and method for predicting and fulfilling a gap between user's perceived look and/or attribute(s) with a product's actual attribute(s).

Another object of the invention is to provide a system and method for predicting and fulfilling a gap between a user's actual look attributes and a buyer's perceived look attributes.

Yet another object of the invention is to provide a system and method for predicting and fulfilling a gap between a product's described attribute(s) and a product's actual performance-based attribute(s).

Still another object of the invention is to provide a system and method for predicting and fulfilling a gap between a predicts a user's (who has used a product) perceived look attribute(s), perceived product attribute(s), the user's actual look attribute(s), and the user's actual look attribute(s).

An additional object of the invention is to provide a system and method for eliminating a time-consuming process or trials and errors between a user's consonance and dissonance.

Yet an additional object of the invention is to provide a conclusive, evidential, output by eliminating a gap between consonance and dissonance.

According to this invention, there is provided a computer-implemented method, caused by a server, for creating an ever-expanding, self-calibrating, array of one or more types of attributes, said method comprising:

defining a first n-dimensional attribute array having a plurality of a first set of blocks, each block, from the first set of blocks, having a first type of data item resident, in that, each of said first set of blocks being defined, in terms of one or more dimensions correlating to a first set of attributes, each dimension correlative to at least a vector, each attribute, vide its vector, having a scalar range defined by an upper threshold value (ut) and a lower threshold value (lt), in that, at least a first dimension, of each block, of said n-dimensional attribute array, corresponding to a first attribute, corresponding to a first vector;

at least a second dimension, of each block, of said n-dimensional attribute array, corresponding to a second attribute, corresponding to a second vector;

at least a third dimension, of each block, of said n-dimensional attribute array, corresponding to a third attribute, corresponding to a third vector;

each of said first type of data items being defined, in terms of one or more first set of attributes, defining a second n-dimensional identity array having a plurality of second set of blocks, each block, from the second set of blocks, having a second type of data item resident, in that, each of said second set of blocks being defined, in terms of one or more dimensions, correlating to a second set of attributes, each dimension correlative to at least a vector, each attribute, vide its vector, having a scalar range defined by an upper threshold value (ut) and a lower threshold value (lt), in that, at least a first dimension, of each block, from said second set of blocks, of said n-dimensional identity array, corresponding to a fourth attribute, corresponding to a fourth vector;

at least a second dimension, of each block, from said second set of blocks, of said n-dimensional array, corresponding to a fifth attribute, corresponding to a fifth vector;

each of said second type of data items being defined, in terms of one or more second set of user attributes, determining spatial extrapolation, in terms of strengths of association, between at least one of said fourth vector and said fifth vector and at least one of said first vector, said second vector, and said third vector in a pre-defined range, said determination leading to a correlation between said first n-dimensional attribute array and said second n-dimensional attribute array;

creating a modified n-dimensional array, based on said first n-dimensional array by polling data from said second n-dimensional array, said modified n-dimensional array being created by:

intelligently mapping each of said new second type of data items, in a corresponding new block, of said modified n-dimensional array, of said first n-dimensional array, in that, said new block being defined by:
    said new first type of data item such that said spatial extrapolation, in terms of strengths of association determines that its scalar value does not fit within any pre-defined scalar range;
    said new first type of data item such that said spatial extrapolation, in terms of strengths of association, between at least one of said fourth vector and said fifth vector and at least one of said first vector, said second vector, and said third vector is in a pre-defined range;
    intelligently locating each of said new first type of data items, in said new block of said modified n-dimensional attribute array, in that,
    said new block being placed at a location such that there is at least one common edge between at least one vector selected from said first vector, said second vector, and said third vector; and/or
    said new block being placed at a location such that there is at least one common edge between at least one vector selected from said fourth vector, and said fifth vector; and/or
    said new block being placed at a location such that its scalar range fits within two previously-adjacent edges of blocks of said first n-dimensional array.

In at least an embodiment, at least a first dimension, of each block, from said first set of blocks, of said first n-dimensional attribute array, corresponding to a first product attribute, having a first product range in terms of first vectors.

In at least an embodiment, at least a second dimension, of each block, from said first set of blocks, of said first n-dimensional attribute array, corresponding to a second product attribute, having a second product range in terms of second vectors.

In at least an embodiment, at least a second dimension, of each block, from said first set of blocks, of said first n-dimensional attribute array, corresponding to a third product attribute, having a third product range in terms of third vectors.

In at least an embodiment, each of said product data items being defined, in terms of one or more product attributes, in that,
    at least a first product attribute correlative to product formulation;
    at least a second product attribute correlative to product price; and
    at least a third product attribute correlative to product application.

In at least an embodiment, at least a first dimension, of each block, of said second n-dimensional identity array, corresponding to a first user attribute, having a first user range in terms of fourth vectors.

In at least an embodiment at least a second dimension, of each block, of said second n-dimensional identity array, corresponding to a second user attribute, having a first user range in terms of fifth vectors.

In at least an embodiment, each of said user data items being defined, in terms of one or more user attributes, in that,
    at least a first fixed user attribute correlative to said user's fixed attributes; and
    at least a second variable attribute correlative to said user's variable attributes.

In at least an embodiment, said steps of intelligently locating and intelligently mapping, further comprising the steps of:
    doping, by way of correlating via spatial extrapolation, in terms of strengths of association, of said fourth vector to at least one of said first vector, said second vector, and said third vector which gives an output (data item) which is beyond outer threshold of at least one of said first vector, said second vector, and said third vector of a first block but not within inner threshold of at least one of said first vector, said second vector, and said third vector of an adjacent second block, the first block and the second block sharing at least a common edge defined at least by one of said first vector, said second vector, and said third vector; the output (data item) now has to be placed in a new block between said first block and said second block such that the betweenness is defined by:
    at least one common edge defined at least by a vector selected from one of said first vector, said second vector, and said third vector, the selection of commonality of one of more edges being defined by checking for truth models, to check if:
    the truth value of said fourth vector affects at least a first vector to be pushed out of scope of predefined ranges of first block and second block;
    the truth value of said fourth vector affects at least a second vector to be pushed out of scope of predefined ranges of first block and second block; and/or
    the truth value of said fourth vector affects at least a third vector to be pushed out of scope of predefined ranges of first block and second block.

In at least an embodiment, said steps of intelligently locating and intelligently mapping, further comprising the steps of:
    doping, by way of correlating via spatial extrapolation, in terms of strengths of association, of said fifth vector to at least one of said first vector, said second vector, and said third vector which gives an output (data item) which is beyond outer threshold of at least one of said first vector, said second vector, and said third vector of a first block but not within inner threshold of at least one of said first vector, said second vector, and said third vector of an adjacent second block, the first block and the second block sharing at least a common edge defined at least by one of said first vector, said second vector, and said third vector; the output (data item) now has to be placed in a new block between said first block and said second block such that the betweenness is defined by:
    at least one common edge defined at least by a vector selected from one of said first vector, said second vector, and said third vector, the selection of commonality of one of more edges being defined by checking for truth models, to check if:
    the truth value of said fifth vector affects at least a first vector to be pushed out of scope of predefined ranges of first block and second block;
    the truth value of said fifth vector affects at least a second vector to be pushed out of scope of predefined ranges of first block and second block; and/or
    the truth value of said fifth vector affects at least a third vector to be pushed out of scope of predefined ranges of first block and second block.

In at least an embodiment, said steps of intelligently locating and intelligently mapping, further comprising the steps of:

receiving a new data item with first set of attributes;
checking if said received new data item can reside on an existing block, already a part of the first n-dimensional array/matrix, based on lower threshold value (lt) and upper threshold value (ut) or whether it warrants creation of a new block if the values lie in the non-contiguous portion/s of the already-defined threshold values of the already-defined blocks of the first n-dimensional array/matrix In at least an embodiment, said steps of intelligently locating and intelligently mapping, further comprising the steps of:
receiving a new data item with second set of attributes;
checking if said received new data item can reside on an existing block, already a part of the second n-dimensional array/matrix, based on lower threshold value (lt) and upper threshold value (ut) or whether it warrants creation of a new block if the values lie in the non-contiguous portion/s of the already-defined threshold values of the already-defined blocks of the first n-dimensional array/matrix.

In at least an embodiment, adjacent blocks of said first n-dimensional array being non-contiguous in terms of vectorized magnitudes, in that, a lower threshold value (lt), of a first dimension (first vector), of a block does not start where the upper threshold value (ut), of a first dimension (first vector), of a block ends.

In at least an embodiment, said first n-dimensional array/matrix having blocks;
each block comprising data items;
each block comprising edges representing dimensions vide vectorized directions, in turn, representing attributes correlative to the stored data items; and
each edge comprising a lower threshold value (lt) and an upper threshold value (ut), the threshold values representing boundaries for the data items on the respective block vide vectorized magnitudes, in turn representing weights correlative to the stored data items.

In at least an embodiment, said second n-dimensional array/matrix having blocks;
each block comprising data items;
each block comprising edges representing dimensions vide vectorized directions, in turn, representing biases correlative to the stored data items; and
each edge comprising a lower threshold value (lt) and an upper threshold value (ut), the threshold values representing boundaries for the data items on the respective block vide vectorized magnitudes, in turn representing weights correlative to the stored data items.

According to this invention, there is provided a system comprising:
one or more processors; and
a non-transitory computer-readable medium or media comprising one or more sequences of instructions which, when executed by at least one of the one or more processors, causes steps to be performed comprising:
defining a first n-dimensional attribute array having a plurality of a first set of blocks, each block, from the first set of blocks, having a first type of data item resident, in that,
each of said first set of blocks being defined, in terms of one or more dimensions correlating to a first set of attributes, each dimension correlative to at least a vector, each attribute, vide its vector, having a scalar range defined by an upper threshold value (ut) and a lower threshold value (lt), in that,
at least a first dimension, of each block, of said n-dimensional attribute array, corresponding to a first attribute, corresponding to a first vector;
at least a second dimension, of each block, of said n-dimensional attribute array, corresponding to a second attribute, corresponding to a second vector;
at least a third dimension, of each block, of said n-dimensional attribute array, corresponding to a third attribute, corresponding to a third vector;
each of said first type of data items being defined, in terms of one or more first set of attributes,
defining a second n-dimensional identity array having a plurality of second set of blocks, each block, from the second set of blocks, having a second type of data item resident, in that,
each of said second set of blocks being defined, in terms of one or more dimensions, correlating to a second set of attributes, each dimension correlative to at least a vector, each attribute, vide its vector, having a scalar range defined by an upper threshold value (ut) and a lower threshold value (lt), in that,
at least a first dimension, of each block, from said second set of blocks, of said n-dimensional identity array, corresponding to a fourth attribute, corresponding to a fourth vector;
at least a second dimension, of each block, from said second set of blocks, of said n-dimensional array, corresponding to a fifth attribute, corresponding to a fifth vector;
each of said second type of data items being defined, in terms of one or more second set of user attributes,
determining spatial extrapolation, in terms of strengths of association, between at least one of said fourth vector and said fifth vector and at least one of said first vector, said second vector, and said third vector in a pre-defined range, said determination leading to a correlation between said first n-dimensional attribute array and said second n-dimensional attribute array;
creating a modified n-dimensional array, based on said first n-dimensional array by polling data from said second n-dimensional array, said modified n-dimensional array being created by:
intelligently mapping each of said new second type of data items, in a corresponding new block, of said modified n-dimensional array, of said first n-dimensional array, in that,
said new block being defined by:
said new first type of data item such that said spatial extrapolation, in terms of strengths of association determines that its scalar value does not fit within any pre-defined scalar range;
said new first type of data item such that said spatial extrapolation, in terms of strengths of association, between at least one of said fourth vector and said fifth vector and at least one of said first vector, said second vector, and said third vector is in a pre-defined range;
intelligently locating each of said new first type of data items, in said new block of said modified n-dimensional attribute array, in that,
said new block being placed at a location such that there is at least one common edge between at least one vector selected from said first vector, said second vector, and said third vector; and/or
said new block being placed at a location such that there is at least one common edge between at least one vector selected from said fourth vector, and said fifth vector; and/or said new block being placed at a location such that its scalar range fits within two previously-adjacent edges of blocks of said first n-dimensional array.

BRIEF DESCRIPTION OF THE ACCOMPANYING DRAWINGS

The invention will now be described in relation to the accompanying drawings, in which.

DETAILED DESCRIPTION

Figure 1:
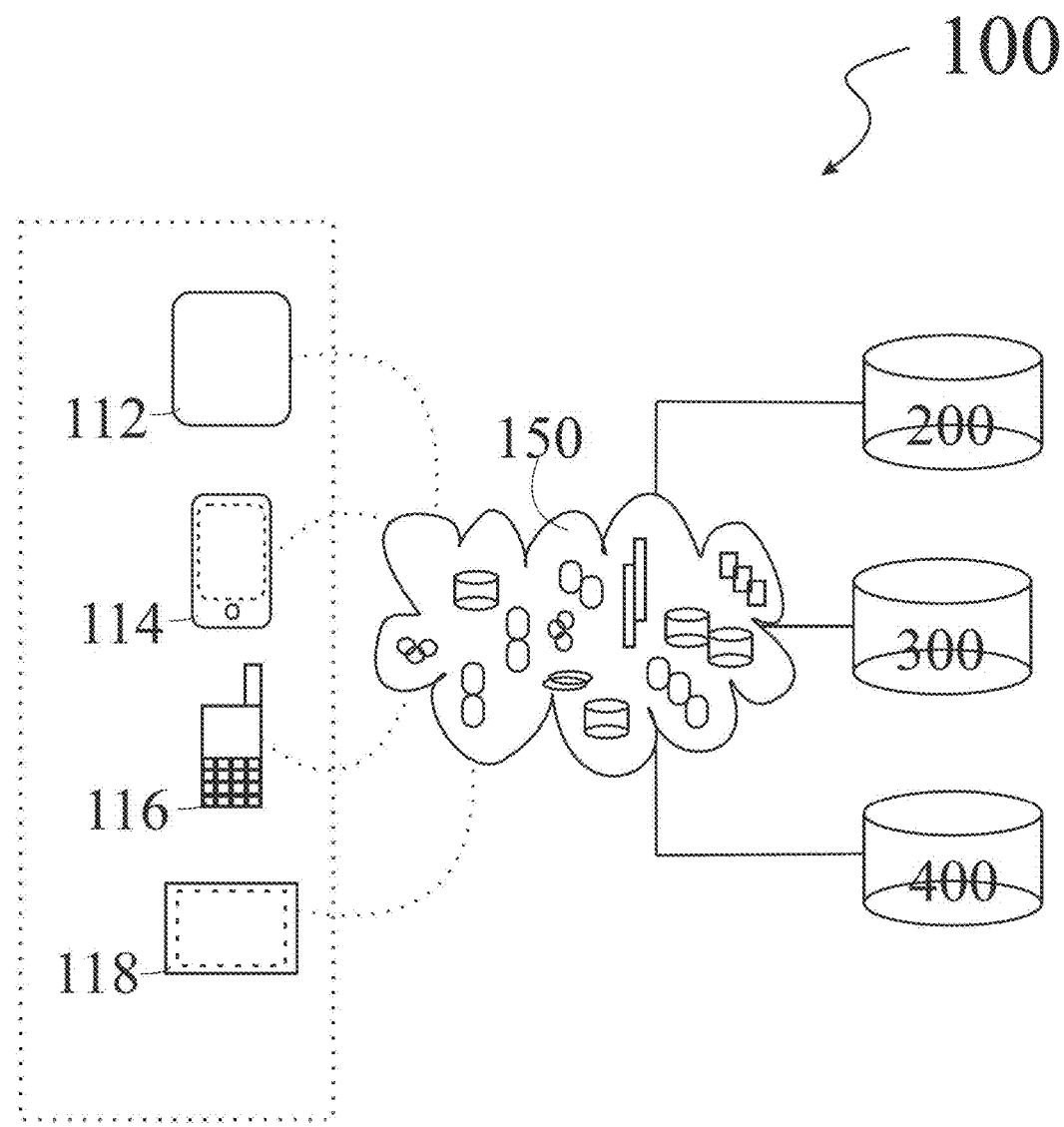
FIG. 1 illustrates a schematic block diagram of a computing environment.

The present disclosure may be a system, a method, and/or a computer program product. The computer program product may include a computer readable storage medium (or media) having computer readable program instructions thereon for causing a processor to carry out aspects of the present disclosure.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

In describing the invention, the following definitions are applicable throughout (including above).

The term "computer" may refer to one or more apparatus or one or more systems that are capable of accepting a structured input, processing the structured input according to prescribed rules, and producing results of the processing as output. Examples of a computer may include: a computer; a stationary or portable computer; a computer having a single processor, multiple processors, or multi-core processors, which may operate in parallel or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

The term "Software" may refer to prescribed rules to operate a computer or a portion of a computer. Examples of software may include: code segments; instructions; applets; pre-compiled code; compiled code; interpreted code; computer programs; and programmed logic.

The term "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; or other types of media that can store machine-readable instructions thereon.

The term "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting or receiving information between the computer systems; and one or more apparatuses or one or more systems that may accept data, may process data in accordance with one or more stored software programs, may generate results, and typically may include input, output, storage, arithmetic, logic, and control units.

The term "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) or wireless connections (e.g., radio frequency waveforms, free-space optical waveforms, acoustic waveforms, satellite transmissions, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), or synchronous optical network (SONET), user datagram protocol (UDP), IEEE 802.x, etc.

The terms "data" and "data item" as used herein refer to sequences of bits. Thus, a data item may be the contents of a file, a portion of a file, a page in memory, an object in an object-oriented program, a digital message, a digital scanned image, a part of a video or audio signal, or any other entity which can be represented by a sequence of bits. The term "data processing" herein refers to the processing of data items, and is sometimes dependent on the type of data item being processed. For example, a data processor for a digital image may differ from a data processor for an audio signal.

The term "client device" may include at least one of: a computing device; a communications device; a storage device comprising at least one of: a hard drive, a universal serial bus (USB) device, a flash memory device, a memory device, a magnetic device, an optical, a magneto-optical (MO), a compact disk (CD), a radio frequency identification device (RFID), a passive device, an active device, or a chip; a card; a smartcard; a telephony device; personal digital assistant (PDA); a handheld device; a portable device; a wireless device; or a networked device.

The term "client device" is intended to include all possible types of devices capable of inputting information and/or outputting information from the networked server (150) to users or other computer systems (e.g., a display screen, a speaker, a desktop computer, a laptop computer, mobile device, tablet, a PDA, etc.), such as 112, 114, 116, 118.

The term "storage medium" may include at least one of: a hard disk; a universal serial bus (USB) storage medium; a flash memory medium; a non-volatile memory medium; memory; a magnetic medium; an optical medium; a magneto-optical (MO) medium; a compact disk (CD) medium; a digital versatile disk (DVD) medium; CD-R medium; a DVD-R medium; a radio frequency identification (RFID) medium; a passive medium; an active medium; or a medium comprising a chip.

The term "user interface" is used in context of a mechanism for allowing a user to read, write, store, retrieve, edit, modify, add to, update, delete, insert, upload, data mine, download, transfer, email, schedule, notify, alert, text message, or instant message the system, method, and data of this invention The term "intelligence" may be at least one of fuzzy logic, artificial intelligence (AI), a knowledge base (KB), a neural network, a decision support system (DSS), agent, software agent, or an expert system. In an exemplary aspect, the intelligence may be fuzzy logic.

The term "analysis engine" may comprise at least one of: means for suggesting improved care; means for creating arrays/matrices, means for polling products for product attributes, means for polling users for user attributes, means for polling experts for expert attributes, means for fetching and storing data, means for mapping, means for locating, means for recommendation, means for defining scalar quantities, means for defining vectors, means for determining directions, means for triaging, means for inputting, means for outputting, means for orienting, means for forming shade cards, means for determining experts' biased vis-à-vis products, means for determining users' biased vis-à-vis products, means for feedback, means for determining/fetching and storing product data, means for determining/fetching and storing product metadata, means for determining/fetching and storing experts' data, means for determining/fetching and storing users' data.

The term "Communicable coupling", or "communicable linking", may be provided by a communication network (wired, wireless, WiFi, LAN, etc.), a cloud platform, and so forth. Such communicable coupling, or communicable linking, may facilitate communications and data exchange between different system components.

The term "network" may be any type of network (including infrastructure) that provides communications, exchanges information, and/or facilitates the exchange of information between the components of system (100). The network may be included or be part of the Internet, a Local Area Network, a wireless network (e.g., a Wi-Fi/302.11 network), or other suitable connections. In other embodiments, one or more components of system (100) may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

The term "networked server" refers to a computer platform that provides services via a network, such as the Internet. In an example configuration, a networked server (150) may use virtual machines that may not correspond to individual hardware. For example, computational and/or storage capabilities may be implemented by allocating appropriate portions of desirable computation/storage power from a scalable repository, such as a data center or a distributed computing environment. In one example, the networked server (150) may implement the methods described herein using customized hard-wired logic, one or more Application Specific Integrated Circuits (ASICs) or Field Programmable Gate Arrays (FPGAs), firmware, and/or program logic which, in combination with the computer system, cause server (150) to be a special-purpose machine.

In example configurations, the networked server (150) may communicate with an associated cloud server and cloud database. The communications between various servers and databases may be used in a quality enforcement process, for upgrading the recognition engine and the software from time to time, for extracting information from, and so forth. Consistent with another embodiment, the communications between the servers and the databases may be discontinuous (purposely or unintentional) and the server may be configured to operate independently from the databases.

The term "networked server (150)" may be a cloud server that processes information/data received directly (or indirectly) from one or more user entry module and processes the information/data to detect and/or identify and/or classify at least some of the user attributes/user parameters. The term "networked server" refers to a computer platform that provides services via a network, such as the Internet. In an example configuration, a networked server (150) may use virtual machines that may not correspond to individual hardware. For example, computational and/or storage capabilities may be implemented by allocating appropriate portions of desirable computation/storage power from a scalable repository, such as a data center or a distributed computing environment. In one example, the networked server (150) may implement the methods described herein using customized hard-wired logic, one or more Application Specific Integrated Circuits (ASICs) or Field Programmable Gate Arrays (FPGAs), firmware, and/or program logic which, in combination with the computer system, cause server (150) to be a special-purpose machine.

The term "product database (200)" may be included on a volatile or non-volatile, magnetic, semiconductor, tape, optical, removable, non-removable, or other type of storage device or tangible or non-transitory computer-readable medium. Product database (200) may also be part of the networked server (150) or separate from the networked server (150). When the product database (200) is not part of the networked server (150), the networked server (150) may exchange data with product database (200) via a communication link. Product database (200) may include one or more memory devices that store data and instructions used to perform one or more features of the disclosed embodiments. In one embodiment, product database (200) may include any suitable databases, ranging from small databases hosted on a work station to large databases distributed among data centers. Product database (200) may also include any combination of one or more databases controlled by memory controller devices (e.g., server(s), etc.) or software. For example, databases may include document management systems, Microsoft SQL databases, SharePoint databases, Oracle™ databases, Sybase.™. databases, other relational databases, or non-relational databases, such as mongo and others.

The term "Expert database (300)" may be included on a volatile or non-volatile, magnetic, semiconductor, tape, optical, removable, non-removable, or other type of storage device or tangible or non-transitory computer-readable medium. Expert database (300) may also be part of the networked server (150) or separate from the networked server (150). When the expert database (300) is not part of the networked server (150), the networked server (150) may exchange data with expert database (300) via a communication link. Expert database (300) may include one or more memory devices that store data and instructions used to perform one or more features of the disclosed embodiments. In one embodiment, expert database (300) may include any suitable databases, ranging from small databases hosted on a work station to large databases distributed among data centers. Expert database (300) may also include any combination of one or more databases controlled by memory controller devices (e.g., server(s), etc.) or software. For example, databases may include document management systems, Microsoft SQL databases, SharePoint databases, Oracle™ databases, Sybase.™. databases, other relational databases, or non-relational databases, such as mongo and others.

The term "User database (300)" may be included on a volatile or non-volatile, magnetic, semiconductor, tape, optical, removable, non-removable, or other type of storage device or tangible or non-transitory computer-readable medium. User database (300) may also be part of the networked server (150) or separate from the networked server (150). When the user database (200) is not part of the networked server (150), the networked server (150) may exchange data with user database (200) via a communication link. User database (300) may include one or more memory devices that store data and instructions used to perform one or more features of the disclosed embodiments. In one embodiment, user database (300) may include any suitable databases, ranging from small databases hosted on a work station to large databases distributed among data centers. User database (300) may also include any combination of one or more databases controlled by memory controller devices (e.g., server(s), etc.) or software. For example, databases may include document management systems, Microsoft SQL databases, SharePoint databases, Oracle™ databases, Sybase.™. databases, other relational databases, or non-relational databases, such as mongo and others.

The term "user entry module" may be available, for use, virtually, digitally, or physically, to a user to capture one or more parameters to finally achieve a cumulative user person. In some embodiments, user-related parameters/attributes are captured via one or more of text entries, image capturing modules for capturing images of the user, scanning modules for capturing scans of portions of body of a user, voice modules for capturing data relating to the product used by a user, expert recommendations related to a user, and the like. Communicable coupling, or communicable linking, may be provided by a communication network (wired, wireless, WiFi, LAN, etc.), a cloud platform, and so forth. Such communicable coupling, or communicable linking, may facilitate communications and data exchange between different system components.

The term "expert user entry module" may be provided through online channels, offline channels, and the like. In some embodiments, product identities and corresponding expert-product attributes are captured via one or more of text entries, image capturing modules for capturing images of the product as provided by an expert, voice modules for capturing data relating to the product as provided by an expert, and the like. Communicable coupling, or communicable linking, may be provided by a communication network (wired, wireless, WiFi, LAN, etc.), a cloud platform, and so forth. Such communicable coupling, or communicable linking, may facilitate communications and data exchange between different system components.

The term "virtual machines" are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

DETAILED DESCRIPTION OF THE ACCOMPANYING DRAWINGS

According to this invention, there is provided a system configured with an ever expanding, self-calibrating, array/matrix of one or more types of attributes.

FIG. 1 illustrates a schematic block diagram of a computing environment comprising a networked server (150) and multiple client devices (112, 114, 116, 118) interfacing with the networked server (150), by means of a network, according to one embodiment of this invention, the networked server (150) further interfacing with other input databases (product databases (200), expert databases (300), user databases (400), and the like databases).

The "client device" is capable of inputting information and/or outputting information from the networked server (150) to users or other computer systems such as 112, 114, 116, 118.

The system may further include a user interface to allow users to engage with the system.

In at least an embodiment, the system (100) comprises a set of product databases (200), communicably coupled with corresponding nodes, and communicably linked with the network server (150). The product databases (200) are communicably coupled to a product entry module for allowing entry of product identities, along with corresponding product attributes, as defined by a product maker. The product entry module may be located at product maker's facilities, at product sale sites, at product wholesale stores, at product retail stores, at product online channels, and the like. In some embodiments, product identities and corresponding product attributes are captured via one or more of text entries, image capturing modules for capturing images of the product, voice modules for capturing data relating to the product, and the like. According to one embodiment, the networked server (150) may include network interface (214) (which may also be any communications interface) coupled to bus (210). Network interface (214) may provide one-way or two-way data communication to a local network, such as network (302). Network interface (214) may include an integrated services digital network (ISDN) card, cable modem, satellite modem, or a modem to provide a data communication connection to a corresponding type of telephone line. As another example, network interface (214) may include a local area network (LAN) card to provide a data communication connection to a compatible LAN. In another embodiment, network interface (214) may include an Ethernet port connected to radio frequency receivers and transmitters and/or optical (e.g., infrared) receivers and transmitters. The specific design and implementation of network interface (214) depends on the communications network(s) over which networked server (150) is intended to operate. As described above, networked server (150) may be a cloud server or a local server associated with retail store. In any such implementation, network interface (214) may be configured to send and receive electrical, electromagnetic, or optical signals, through wires or wirelessly, that may carry analog or digital data streams representing various types of information. In another example, the implementation of network interface (214) may be similar or identical to the implementation described below for network interface (214).

In at least an embodiment, the networked server (150) may be a cloud server that processes information/data received directly (or indirectly) from one or more product entry module and processes the information/data to detect and/or identify and/or classify at least some of the product attributes.

In another example configuration, the networked server (150) may be part of a system associated with a retail store that communicates with the product entry module using a wireless local area network (WLAN) and may provide similar functionality as a cloud server.

As depicted in FIG. 1, the networked server (150) may be coupled to one or more physical or virtual storage devices such as the product database/s (200). The networked server (150) may access the product database/s (200) to detect and/or identify products along with their corresponding product attributes. The detection may occur through analysis of text or information, fed in through the product entry module, or through features in the captured image using an algorithm and stored data.

In at least an embodiment, the system (100) comprises a set of expert databases (300), communicably coupled with corresponding nodes, and communicably linked with the network server (150). The expert databases (300) are communicably coupled to an expert-user entry module for allowing entry of product identities, along with corresponding expert-product attributes, corresponding to one or more products of the product database (200), as defined by an expert-user.

In at least an embodiment, the networked server (150) may be a cloud server that processes information/data received directly (or indirectly) from one or more expert-user entry module and processes the information/data to detect and/or identify and/or classify at least some of the expert-product attributes.

In another example configuration, the networked server (150) may be part of a system associated with a retail store that communicates with the expert-user entry module using a wireless local area network (WLAN) and may provide similar functionality as a cloud server.

As depicted in FIG. 1, the networked server (150) may be coupled to one or more physical or virtual storage devices such as the expert database/s (300). The networked server (150) may access the expert database/s (300) to determine and/or identify expert-user attributes for identified products. The determination/identification may be through text input entry, image text entry, voice input entry, video input entry, and the like multimedia entry.

In at least an embodiment, the system (100) comprises a set of user databases (400), communicably coupled with corresponding nodes, and communicably linked with the network server (150). The user databases (400) are communicably coupled to a user entry module for allowing entry of user personas, user profiles, and/or user identities, along with corresponding user attributes, as defined by a one or more nodes coupled with an expert, a product, a sensor, a scanner, and/or the its combinations.

The components, and arrangements, shown in FIG. 1 are not intended to limit the disclosed embodiments, as the system components used to implement the disclosed processes and features may vary. In one embodiment, system (100) may include multiple networked servers (150), and each networked server (150) may host a certain type of service. For example, a first server may process text input from product entry modules, a second server may process images from capturing devices to identify product information.

Figure 2:
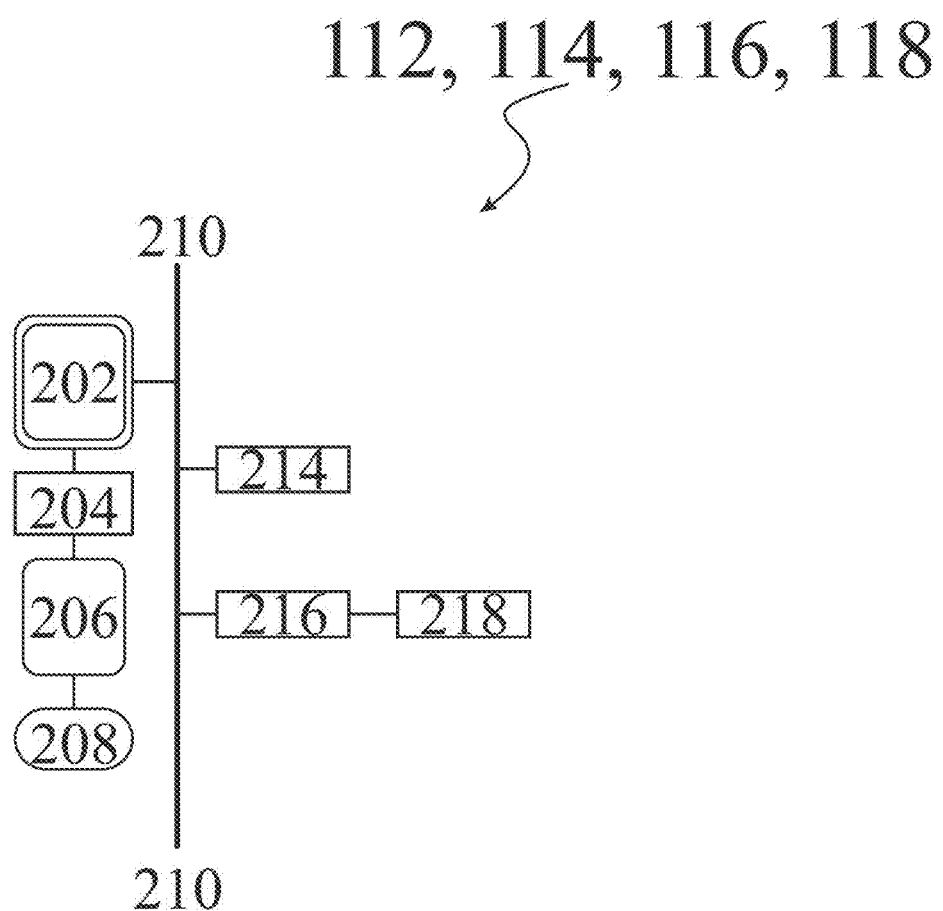
FIG. 2 illustrates a non-limiting exemplary embodiment of a block diagram depicting at least one client device.

FIG. 2 illustrates a non-limiting exemplary embodiment of a block diagram depicting at least one client device (112, 114, 116, 118), according to one embodiment of this invention.

FIG. 2 depicts a processor (202), a memory (204), and an input/output (I/O) user interface formed by a display (206) and a keyboard/mouse/touchscreen (208). More or less devices may be part of the I/O interface. The processor (202), memory (204), and I/O interface are interconnected via computer bus (210) as part of a processing unit or system (212) (such as a computer, workstation, server, client device, etc.). Interconnections via computer bus (210) are also provided to a network interface (214) and a media interface (216). Network interface (214) (which can include, for example, transceivers, modems, routers and Ethernet cards) enables the system to couple to other processing systems or devices (such as remote displays or other computing and storage devices) through intervening private or public computer networks (wired and/or wireless). Media interface (216) (which can include, for example, a removable disk drive) interfaces with media (218).

The processor (202) can include, for example, a central processing unit (CPU), a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor (202). Memory (204) (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

The processor (202) may include at least one processor configured to execute computer programs, applications, methods, processes, or other software to execute particular instructions associated with embodiments described in the present disclosure. The term "processing device" or "processor" refers to any physical device having an electric circuit that performs a logic operation. For example, processor (202) may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processor (202) may include at least one processor configured to perform functions of the disclosed methods such as a microprocessor manufactured by Intel™, Nvidia™, manufactured by AMD™, and so forth. Processor (202) may include a single core or multiple core processors executing parallel processes simultaneously. In one example, processor (202) may be a single core processor configured with virtual processing technologies. Processor (202) may implement virtual machine technologies or other technologies to provide the ability to execute, control, run, manipulate, store, etc., multiple software processes, applications, programs, etc. In another example, processor (202) may include a multiple-core processor arrangement (e.g., dual, quad core, etc.) configured to provide parallel processing functionalities to allow a device associated with processor (202) to execute multiple processes simultaneously. It is appreciated that other types of processor arrangements could be implemented to provide the capabilities disclosed herein.

Furthermore, memory (204) may comprise electronic memory such as random-access memory (RAM), read-only memory (ROM) or other types of memory, in any combination. The one or more software programs when executed by a processing device such as the processing unit or system (212) causes the client device to perform functions associated with one or more of the components/steps of system/methodologies as described by this invention. One skilled in the art would be readily able to implement such software given the teachings provided herein. Other examples of processor-readable storage media embodying embodiments of the invention may include, for example, optical or magnetic disks.

Still further, the I/O interface formed by devices 206 and 208 is used for inputting data to the processor (202) and for providing initial, intermediate and/or final results associated with the processor (202).

Figure 3:
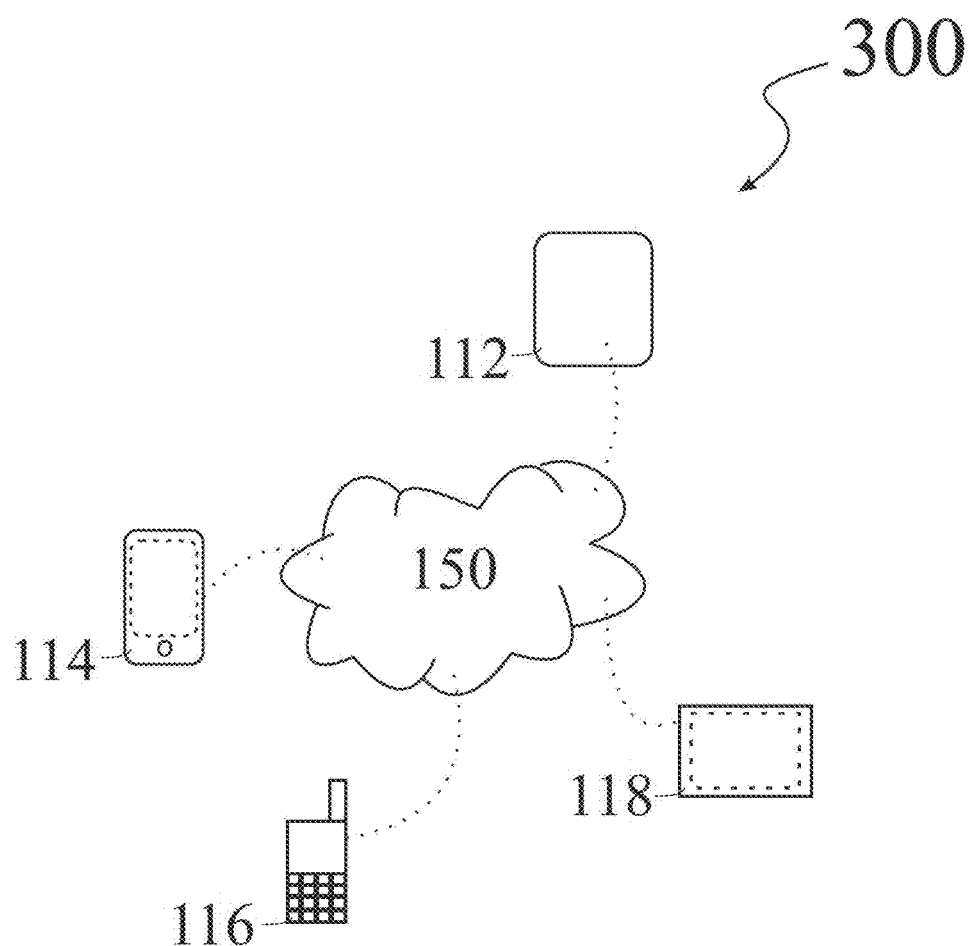
FIG. 3 illustrates a non-limiting exemplary embodiment of a block diagram depicting at least one networked server.

FIG. 3 illustrates a non-limiting exemplary embodiment of a block diagram depicting at least one networked server (150), according to one embodiment of this invention.

FIG. 3 depicts a distributed communications/computing network (processing platform) (300) that includes a plurality of computing devices/client devices (112, 114, 116, 118) configured to communicate with one another over a network (302).

It is to be appreciated that one, more than one, or all of the client devices (112, 114, 116, 118) in FIG. 3 may be configured as shown in FIG. 2. It is to be appreciated that the methodologies described herein may be executed in one such client devices (112, 114, 116, 118), or executed in a distributed manner across two or more such client devices (112, 114, 116, 118). It is to be further appreciated that a server, a client device, a computing device, a processing device, or any other processing platform element may be viewed as an example of what is more generally referred to herein as a "client device." The network (302) may include, for example, a global computer network such as the Internet, a wide area network (WAN), a local area network (LAN), a satellite network, a telephone or cable network, or various portions or combinations of these and other types of networks (including wired and/or wireless networks).

As described herein, the client devices (112, 114, 116, 118) may represent a large variety of devices. For example, the client devices (112, 114, 116, 118) can include a portable device such as a mobile telephone, a smart phone, personal digital assistant (PDA), tablet, computer, a client device, etc. The client devices (112, 114, 116, 118) may alternatively include a desktop or laptop personal computer (PC), a server, a microcomputer, a workstation, a kiosk, a mainframe computer, or any other information processing device which can implement any or all of the techniques detailed in accordance with one or more embodiments of the invention.

One or more of the client devices (112, 114, 116, 118) may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

The processing platform 300 shown in FIG. 3 may comprise additional known components such as batch processing systems, parallel processing systems, physical machines, virtual machines, virtual switches, storage volumes, etc. Again, the particular processing platform shown in this figure is presented by way of example only, and may include additional or alternative processing platforms, as well as numerous distinct processing platforms in any combination. Also, numerous other arrangements of servers, clients, computers, storage devices or other components are possible in processing platform (300).

Furthermore, it is to be appreciated that the processing platform (300) of FIG. 3 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform (300) may also include multiple hypervisors, each running on its own physical infrastructure. Portions of that physical infrastructure might be virtualized.

Figure 4:
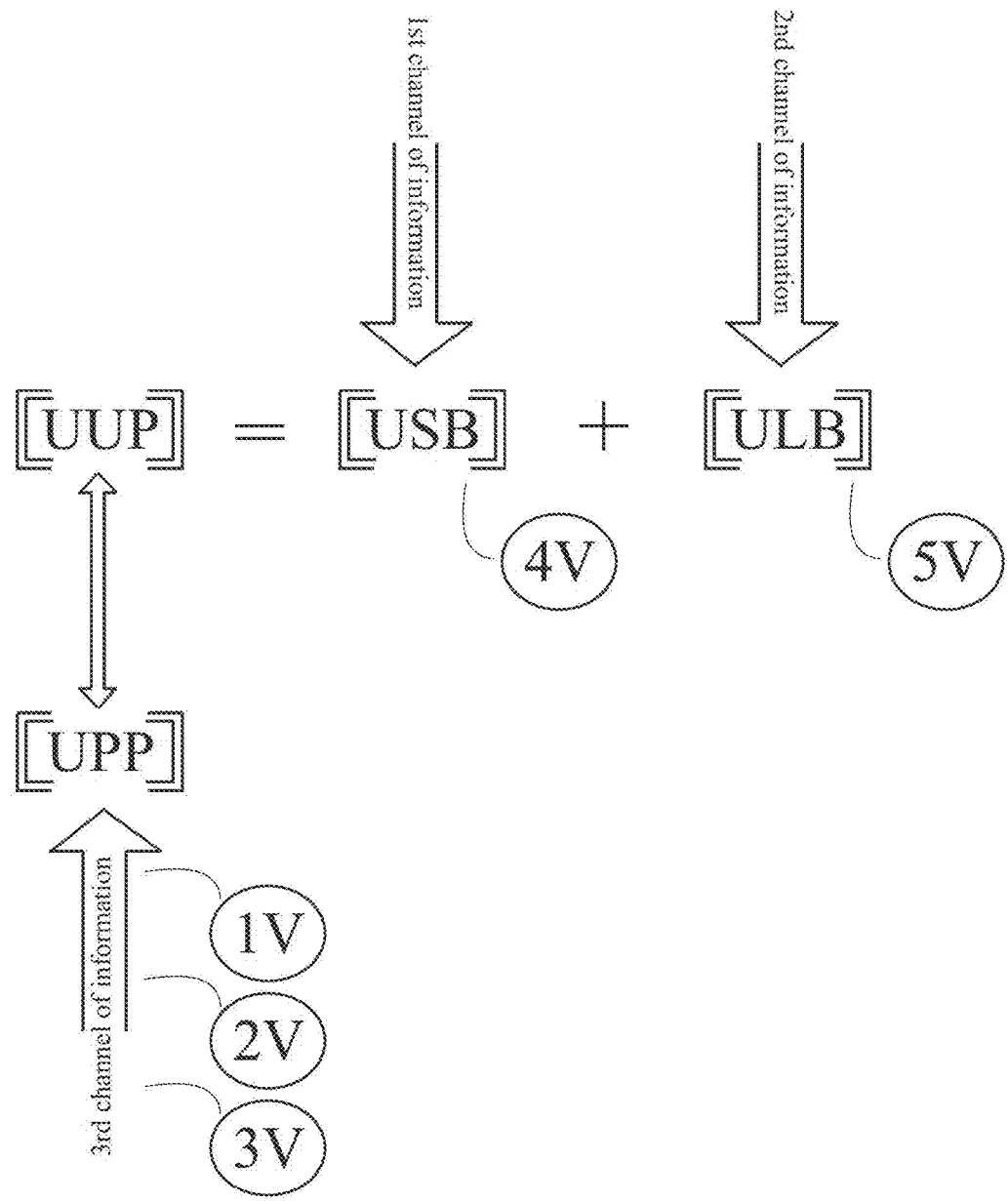
FIG. 4 illustrates an exemplary embodiment in which a Unique User Profile (UUP) is comprised of data items characterized by weighted scalar quantities.

FIG. 4 illustrates an exemplary embodiment in which a Unique User Profile (UUP) is comprised of data items (DI) characterized by weighted scalar quantities. Moreover, a Unique Product Profile (UPP) is comprised of data items (DI) characterized by weighted scalar quantities along with first vector (1V) attributes, second vector (2V) attributes, and third vector (3V) attributes; all polled/received by a third channel of information. Furthermore, an external bias, through a first channel of information, may be a User Scan Bias (USB) which is comprised of data items characterized by weighted scalar quantities along with fourth vector (4V) attributes. Additionally, another external bias, through a second channel of information, may be a User Lifestyle Bias (USB) which is comprised of data items characterized by weighted scalar quantities along with fifth vector (4V) attributes.

In at least an embodiment, data items (DI) characterized by weighted scalar quantities along with first vector (1V) attributes, second vector (2V) attributes, and third vector (3V) attributes form a first n-dimensional array/matrix (500).

In at least an embodiment, data items (DI) characterized by weighted scalar quantities along with fourth vector (4V) attributes, and fifth vector (5V) attributes form a second n-dimensional array/matrix (700).

In at least an embodiment, an output is a modified (expanded/elastic) n-dimensional array/matrix, based on said first n-dimensional array/matrix (500) by polling data/dimensions from said second n-dimensional array/matrix (700). Typically, outputs are "elastic bias-backed databases" in accordance with this invention. In other words, data/tags/dimensions from the second n-dimensional matric (700) is used to bias data/tags/dimensions from the first n-dimensional array/matrix (500); thereby, outputting "elastic bias-backed databases" in accordance with this invention.

In order to achieve this, FIG. 5, FIG. 6, FIG. 7, FIG. 8, FIG. 9, and FIG. 10 are relevant.

In at least an embodiment, the system, of this invention, comprises a first array/matrix generator (410) configured to generate, and create, a first n-dimensional attribute array/matrix (500) having a plurality of a first set of blocks (b1, b2, b3, b4, b5, b6, b7, b8, b9). Each block, of the first set of blocks, typically, is a memory cell configured to store data items (DI), preferably product data items. The co-ordinates of each block, from the first set of blocks, are governed by attributes, preferably product attributes, which determine either what kind of product data is resident on that block or tag corresponding co-ordinates as metadata for the product data resident on that block or provide weights, to the product data, correlative to co-ordinates of that block. These co-ordinates form the 'dimensions' of such 'blocks' forming such 'n-dimensional attribute array/matrix'. Each block is defined by one or more edges, the edges being/defining vectors which correlate with product attributes, and each edge being weighted by scalar values having at least a first (inner/lower) threshold scalar value and at least a second (outer/upper) threshold scalar value.

In preferred embodiments, each 'block' is defined in terms of one or more dimensions, in which a first dimension could be a first product attribute having a first product range in terms of first vectors (1V).

In preferred embodiments, each 'block' is defined in terms of one or more dimensions, in which a second dimension could be a second product attribute having a second product range in terms of second vectors (2V).

In preferred embodiments, each 'block' is defined in terms of one or more dimensions, in which a third dimension could be a third product attribute having a third product range in terms of third vectors (3V).

In preferred embodiments, product data items correspond to one or more product attributes which define a product.

In preferred embodiments, a first product attribute could be a product formulation.

In preferred embodiments, a second product attribute could be a product price.

In preferred embodiments, a third product attribute could be a product application.

In at least an embodiment, the system, of this invention, comprises a second matrix generator (430) configured to generate, and create, a second n-dimensional attribute array/matrix (700) having a plurality of a second set of blocks (z1, z2, z3, z4, z5, z6, z7, z8, z9). Each block, of the second set of blocks, typically, is a memory cell configured to store data items, preferably user data items. The co-ordinates of each block, from the second set of blocks, are governed by attributes, preferably feedback attributes, which determine either what kind of feedback data is resident on that block or tag corresponding co-ordinates as metadata for the feedback data resident on that block or provide weights, to the user data, correlative to co-ordinates of that block. These co-ordinates form the 'dimensions' of such 'blocks' forming such 'n-dimensional attribute array/matrix'.

In preferred embodiments, each 'block is defined in terms of one or more dimensions, in which a first dimension could be a first feedback attribute having a first range in terms of fourth vectors (4V).

In preferred embodiments, each 'block is defined in terms of one or more dimensions, in which a second dimension could be a second feedback attribute having a second user range in terms of fifth vectors (5V).

In preferred embodiments, each 'block is defined in terms of one or more dimensions, in which a first dimension could be a first user attribute having a first user range in terms of fourth vectors.

In preferred embodiments, each 'block is defined in terms of one or more dimensions, in which a second dimension could be a second user attribute having a second user range in terms of fifth vectors.

In preferred embodiments, user data items correspond to one or more user attributes which build a user persona.

In preferred embodiments, a first fixed user attribute could be correlative to said user's fixed attributes.

In preferred embodiments, a second variable user attribute could be correlative to said user's variable attributes.

In preferred embodiments, a third user attribute could be a user input.

In preferred embodiments, a fourth user attribute could be a scanned input, and/or scanned analysis, of a portion of a user' body.

In preferred embodiments, a fifth user attribute could be a scanned input, and/or scanned analysis, of a portion of a user' skin.

In preferred embodiments, a sixth user attribute could be an assessed, and/or an assessed analysis, of a user, as assessed by an expert.

In preferred embodiments, a seventh user attribute could be an assessed, and/or an assessed analysis, of a user, as assessed in correlation with a product usage.

In preferred embodiments, an eighth user attribute could be a user's perception.

Figure 5:
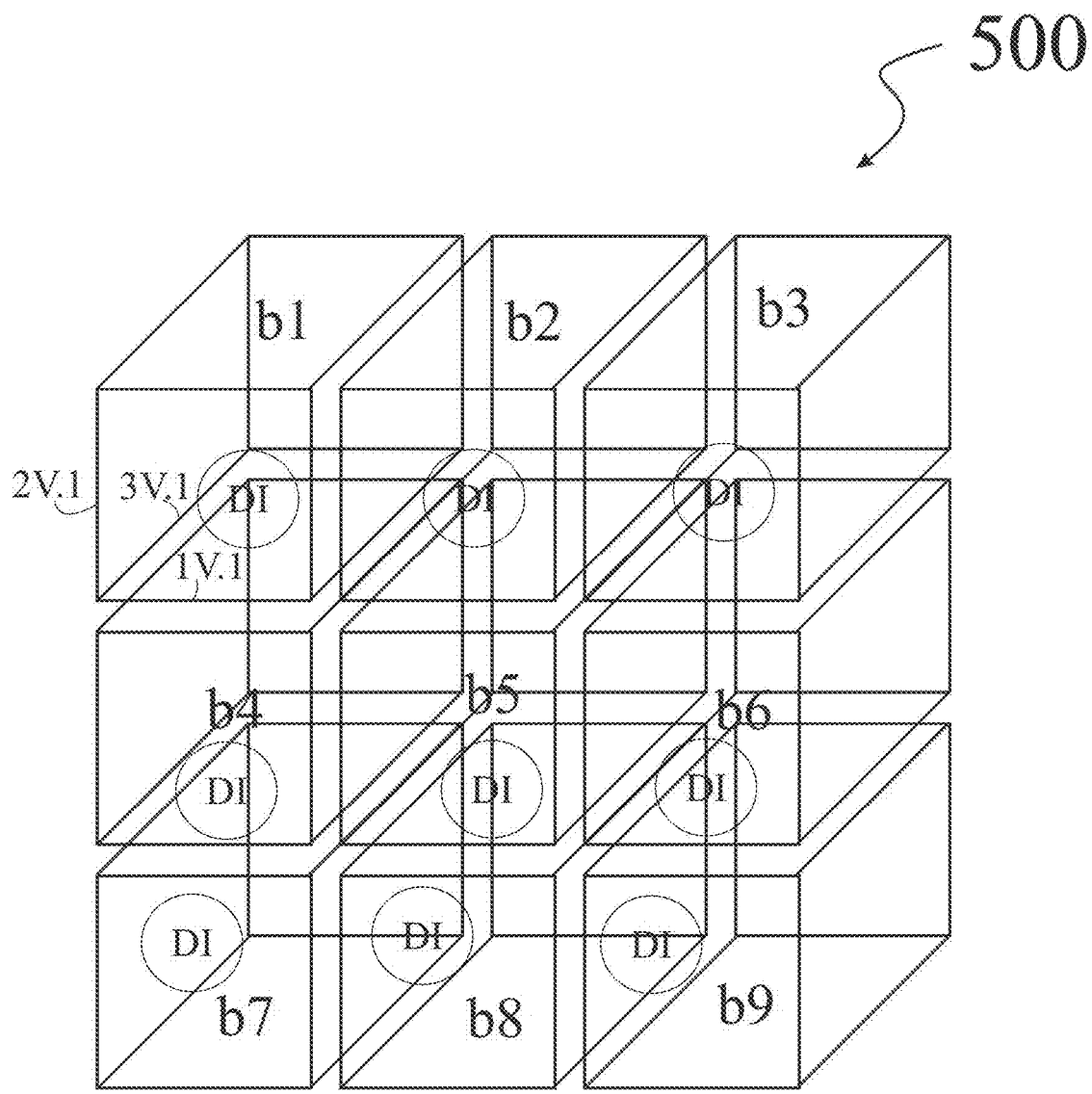
FIG. 5 illustrates a first n-dimensional array/matrix having blocks.

FIG. 5 illustrates a first n-dimensional array/matrix (500) having blocks (b1, b2, b3, b4, b5, b6, b7, b8, b9);
  each block comprising data items (DI);
  each block comprising edges (1V, 2V, 3V) representing dimensions vide vectorized directions, in turn, representing attributes correlative to the stored data items (DI);
  each edge (1V, 2V, 3V) comprising a lower threshold value (lt) and an upper threshold value (ut), the threshold values representing boundaries for the data items on the respective block vide vectorized magnitudes, in turn representing weights correlative to the stored data items (DI).

It is to be noted that adjacent blocks are not contiguous in terms of vectorized magnitudes. In other words, a lower threshold value (lt), of a first dimension (first vector 1V.1), of a block (b2) does not start where the upper threshold value (ut), of a first dimension (first vector 1V.2), of a block (b1) ends. One of the reasons for this structure is the kind of limited initialisation data that it begins with. Once biases are introduced, as explained further ahead in this specification, the databases may expand—and not necessarily at its edges. This is the reason that this invention is formulated.

Figure 6:
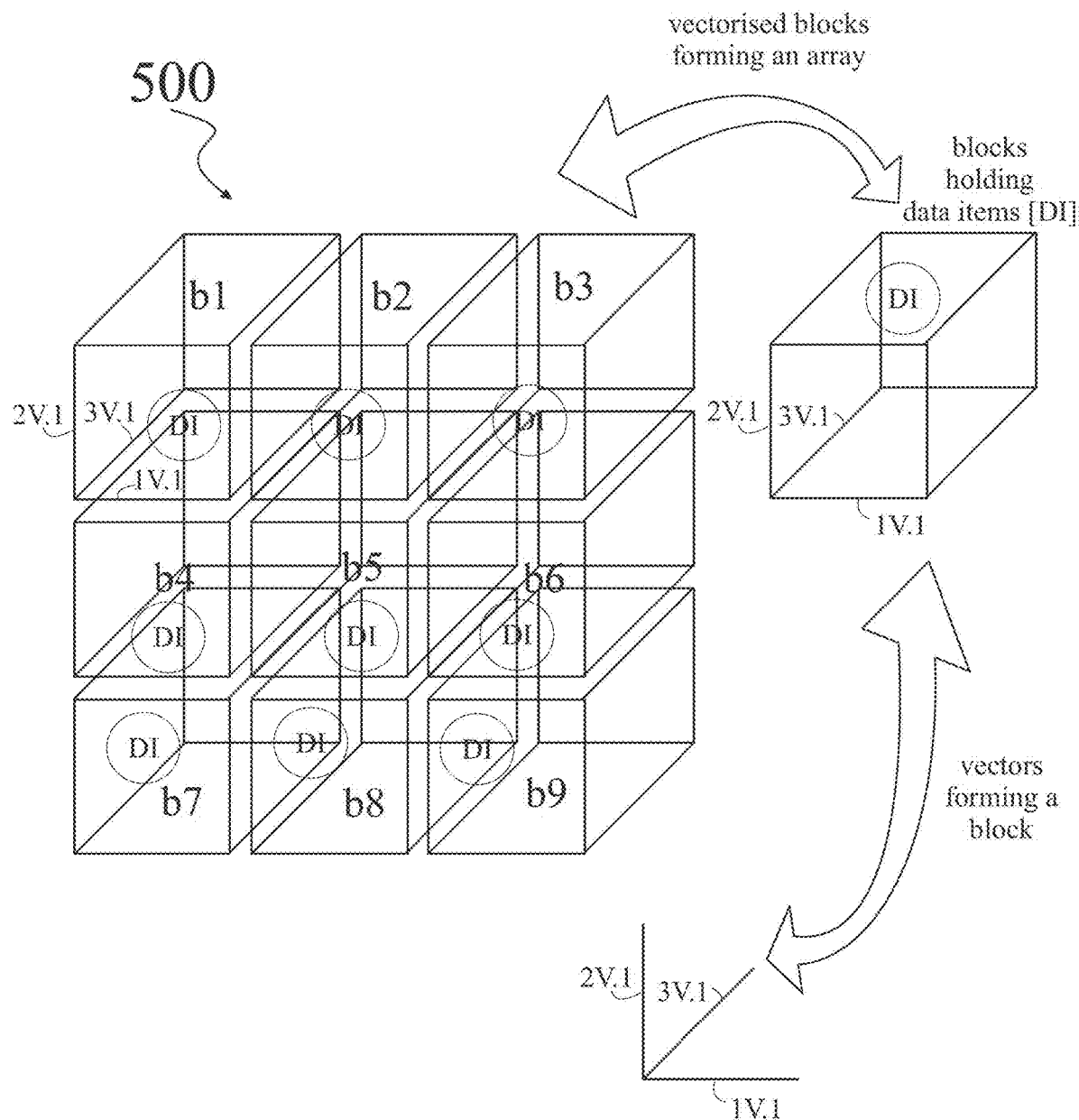
FIG. 6 illustrates how a block is formed from one of more vectors.

FIG. 6 illustrates how a block (b1) is formed from one of more vectors (1V.1, 2V.1, 3V.1). Once data item (DI) is received, it is checked whether it can reside on an existing block, already a part of the first n-dimensional array/matrix (500), based on lower threshold value (lt) and upper threshold value (ut) or whether it warrants creation of a new block if the values lie in the non-contiguous portion/s of the already-defined threshold values of the already-defined blocks (b1, b2, b3, b4, b5, b6, b7, b8, b9) of the first n-dimensional array/matrix (500).

Figure 7:
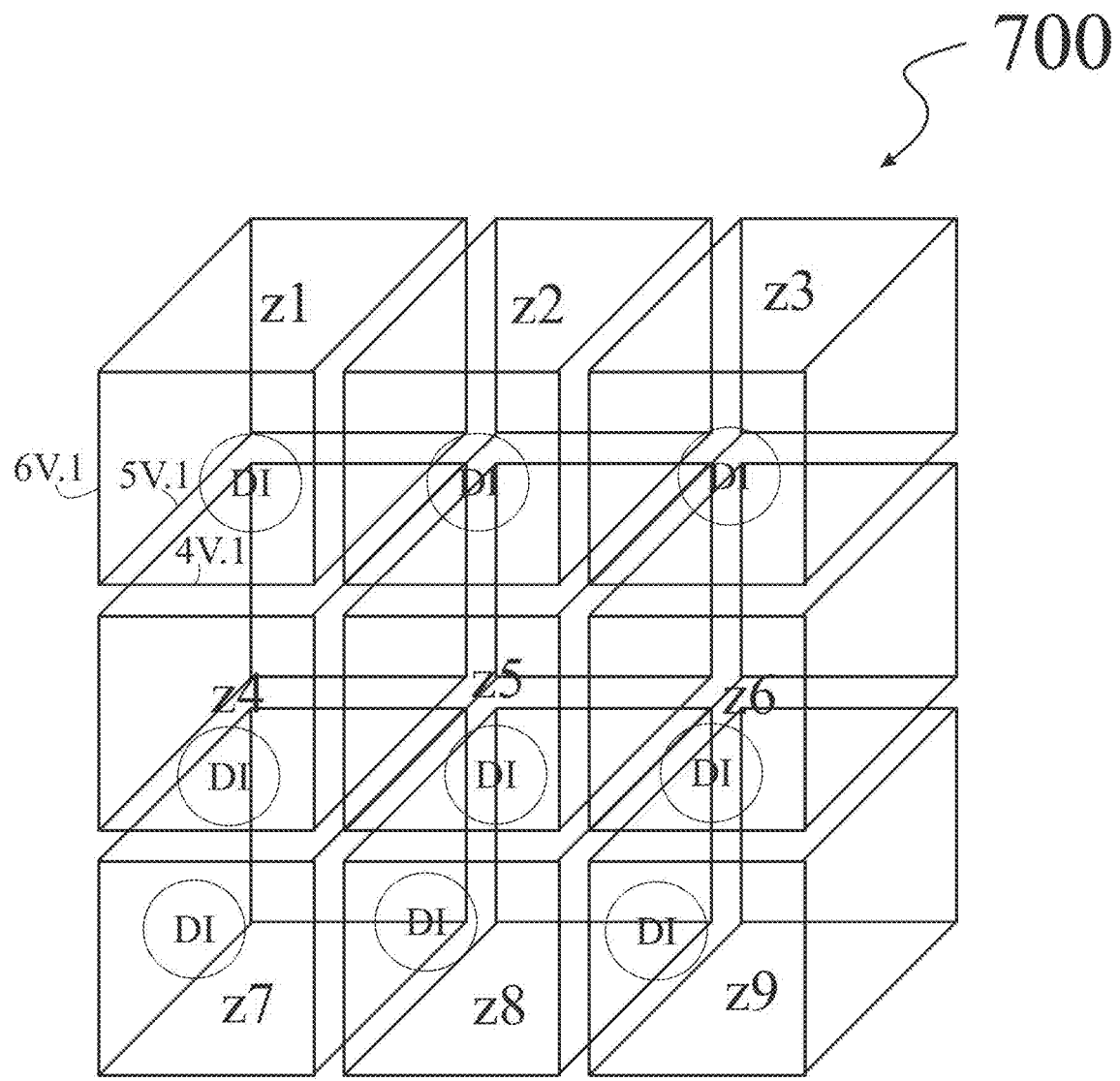
FIG. 7 illustrates a second n-dimensional array/matrix having blocks.

FIG. 7 illustrates a second n-dimensional array/matrix (700) having blocks (z1, z2, z3, z4, 75, z6, z7, z8, z9);
   each block comprising data items (DI);
   each block comprising edges (4V, 5V, 6V) representing dimensions vide vectorized directions, in turn, representing biases correlative to the stored data items (DI);
   each edge (4V, 5V, 6V) comprising a lower threshold value (lt) and an upper threshold value (ut), the threshold values representing boundaries for the data items on the respective block vide vectorized magnitudes, in turn representing weights correlative to the stored data items (DI).

FIG. 6 illustrates how a block (z1) is formed from one of more vectors (4V.1, 5V.1, 6V.1). Once data item (DI), namely a bias, is received, it is checked whether it can reside on an existing block, already a part of the second n-dimensional array/matrix (700), based on lower threshold value (lt) and upper threshold value (ut) or whether it warrants creation of a new block if the values lie in the non-contiguous portion/s of the already-defined threshold values of the already-defined blocks (z1, z2, z3, z4, z5, z6, z7, z8, z9) of the second n-dimensional array/matrix (700).

In preferred embodiments, one type of bias is provided, in terms of feedback, by an expert who validates data items on the block, who validates vectors of the block, and who validates lower threshold values and upper threshold values of the block. An expert dopes a block in terms of vector values and scalar values, through a graphical user interface. In more preferred embodiments, one or more experts dope each block in terms of various vector values and various scalar values; here, the most popular vector value is selected as a best-doped vector value and a weighted sum of scalar values is selected as a best-doped scalar value.

In preferred embodiments, one type of bias is provided, in terms of feedback, by a verified user who validates data items on the block, who validates vectors of the block, and who validates lower threshold values and upper threshold values of the block. A verified user dopes a block in terms of vector values and scalar values, through a graphical user interface. In more preferred embodiments, one or more verified users dope each block in terms of various vector values and various scalar values; here, the most popular vector value is selected as a best-doped vector value and a weighted sum of scalar values is selected as a best-doped scalar value.

Figure 8:
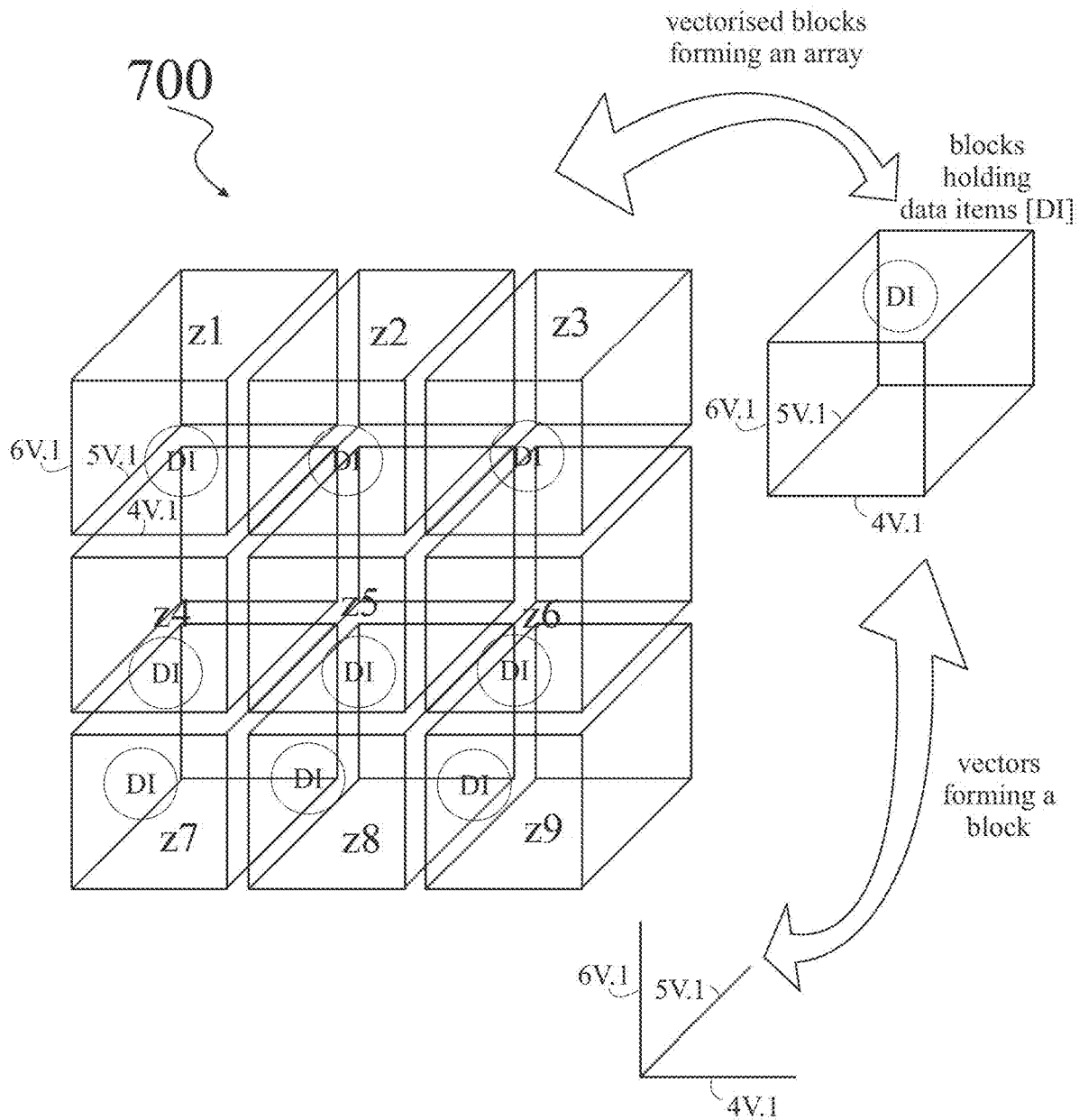
FIG. 8 illustrates how a block is formed from one of more vectors.

FIG. 8 illustrates how a block (z1) is formed from one of more vectors (4V.1, 5V.1, 6V.1).

Figure 9:
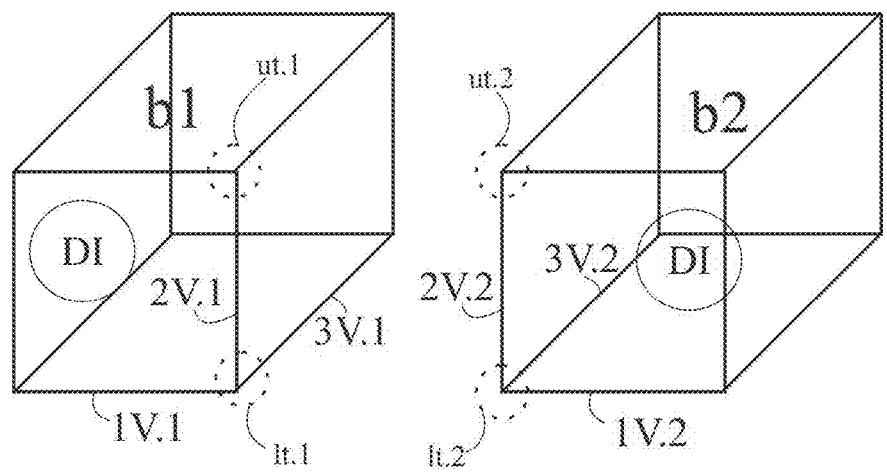
FIG. 9 illustrates upper threshold values (ut) and lower threshold values (lt) per block.

FIG. 9 illustrates upper threshold values (ut) and lower threshold values (lt) per block.

Figure 10:
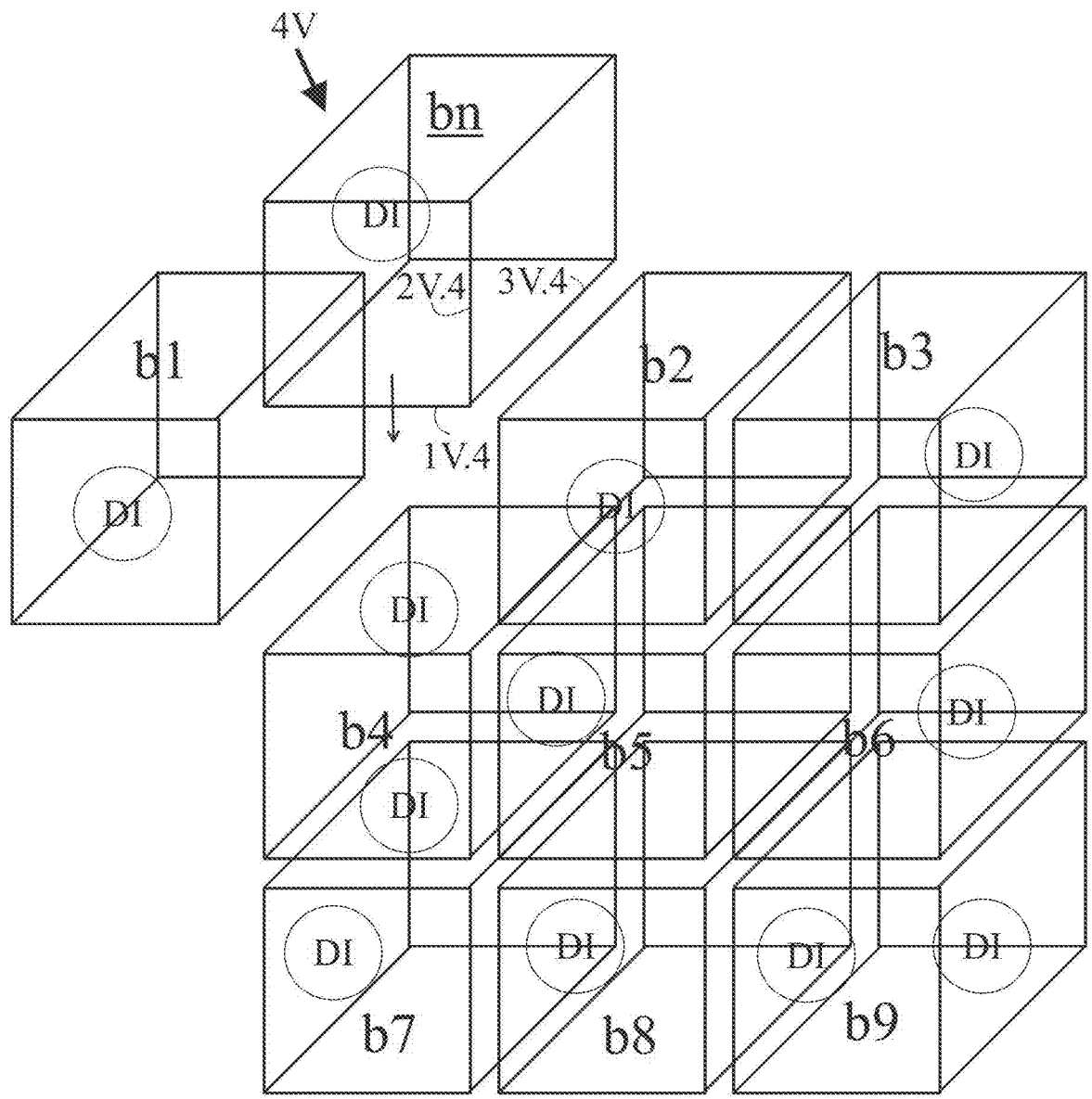
FIG. 10 illustrates a modified n-dimensional block.

FIG. 10 illustrates a modified n-dimensional block.

Figure 11:
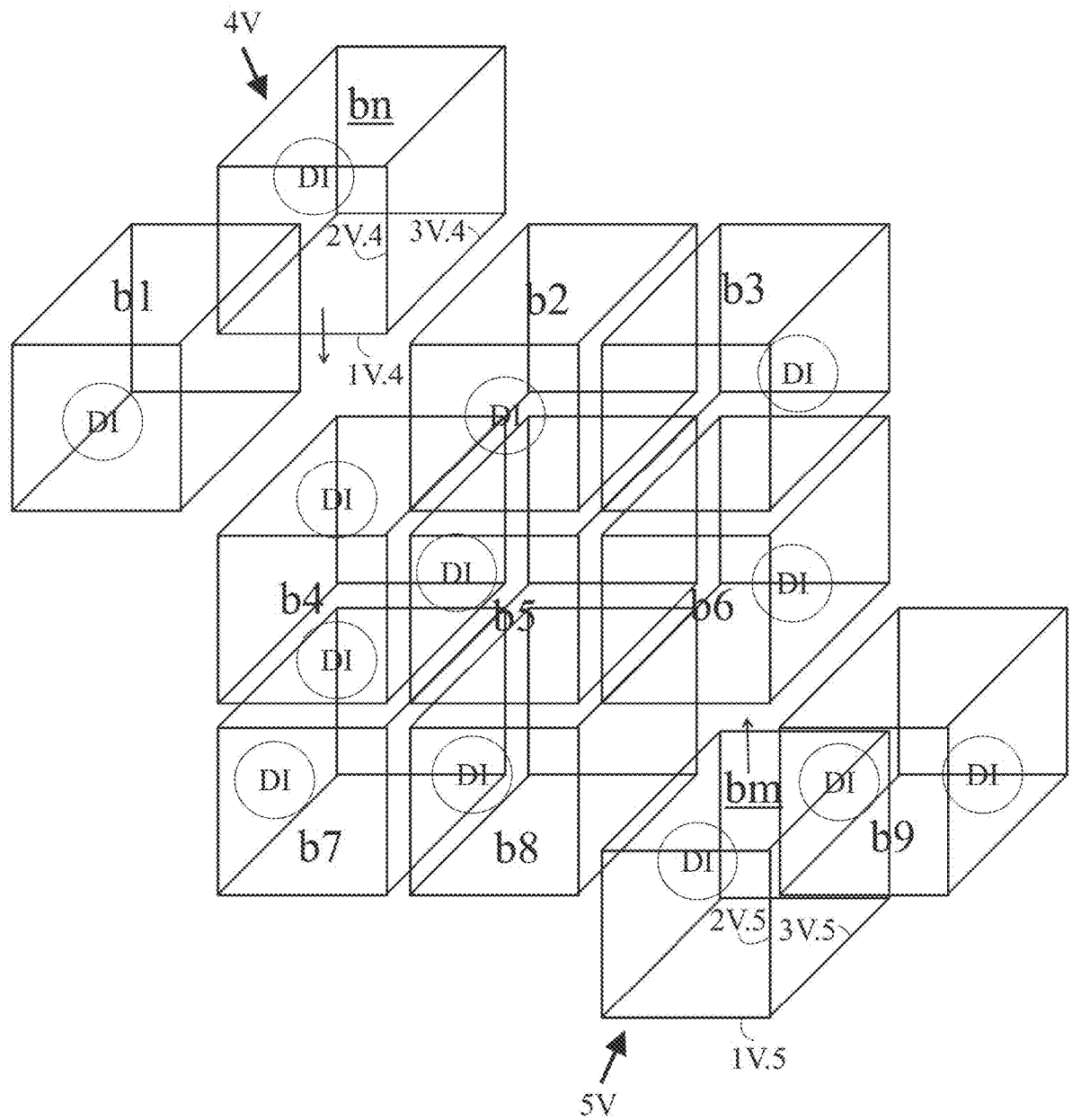
FIG. 11 illustrates a modified n-dimensional block.

FIG. 11 illustrates a modified n-dimensional block.

In at least an embodiment, the system, of this invention, comprises a processor, configured with instructions, stored on a memory, to determine spatial extrapolation between one of said fourth vector and said fifth vector and one of said first vector, said second vector, and said third vector is in a pre-defined range. This pre-defined range can be defined by a user, a product administrator, an expert, and/or a system administrator.

In at least an embodiment, the system, of this invention, comprises a processor, configured with instructions, stored on a memory, to receive a new product data item with one or more new attributes and one or more new ranges based on the afore-mentioned determination.

In at least an embodiment, the system, of this invention, comprises a processor, configured with instructions, stored on a memory, to receive a new user data item with one or more new attributes and one or more new ranges based on the afore-mentioned determination.

In at least an embodiment, the system, of this invention, comprises a processor, configured with instructions, stored on a memory, to intelligently map each of said new product data items, in a corresponding new block, of said product array/matrix, in that,
   said new block being defined by:
   said new product data item such that said spatial extrapolation between one of said fourth vector and said fifth vector and one of said first vector, said second vector, and said third vector is in a pre-defined range.

In at least an embodiment, the system, of this invention, comprises a processor, configured with instructions, stored on a memory, to intelligently map each of said new user data items, in a corresponding new block, of said user array/matrix, in that,
   said new block being defined by:
   said new user data item such that said spatial extrapolation between one of said fourth vector and said fifth vector and one of said first vector, said second vector, and said third vector is in a pre-defined range.

In at least an embodiment, the system, of this invention, comprises a processor, configured with instructions, stored on a memory, to intelligently locate each of said new product data items, in said new block of said n-dimensional attribute array/matrix, in that,
   said new block being placed at a location such that there is at least one common edge between at least one vector selected from said first vector, said second vector, and said third vector.

In at least an embodiment, the system, of this invention, comprises a processor, configured with instructions, stored on a memory, to intelligently locate each of said new user data items, in said new block of said n-dimensional attribute array/matrix, in that,
   said new block being placed at a location such that there is at least one common edge between at least one vector selected from said first vector, said second vector, and said third vector.

The biases (4V, 5V, 6V), residing on the second n-dimensional array/matrix (700), determine whether a new edge is to formed between two adjacent edges, of the blocks (b1, b2, b3, b4, b5, b6, b7, b8, b9), of the first n-dimensional array/matrix (500) with new threshold values or if they conform to existing edges; that determines formation of a new block or not.

In at least an embodiment, the 'intelligent mapping' and the 'intelligent locating' is done as follows:
   doping, by way of correlating via spatial extrapolation, in terms of strengths of association, of said fourth vector (4V) to at least one of said first vector (1V), said second vector (2V), and said third vector (3V) which gives an output (data item) which is beyond outer threshold of at least one of said first vector (1V), said second vector (2V), and said third vector (3V) of a first block but not within inner threshold of at least one of said first vector (1V), said second vector (2V), and said third vector (3V) of an adjacent second block, the first block and the second block sharing at least a common edge defined at least by one of said first vector (1V), said second vector (2V), and said third vector (3V); the output (data item) now has to be placed in a new block between said first block and said second block such that the betweenness is defined by:

at least one common edge defined at least by a vector selected from one of said first vector (1V), said second vector (2V), and said third vector (3V), the selection of commonality of one of more edges being defined by checking for truth models, to check if:

the truth value of said fourth vector (4V) affects at least a first vector (1V) to be pushed out of scope of predefined ranges of first block and second block;

the truth value of said fourth vector (4V) affects at least a second vector (2V) to be pushed out of scope of predefined ranges of first block and second block; and/or the truth value of said fourth vector (4V) affects at least a third vector (3V) to be pushed out of scope of predefined ranges of first block and second block.

In sum, a bias vector value (4V) is checked against a first n-dimensional array's/matrix's (500) block's edges (1V, 2V, 3V) in order to output where, in a 3-dimensional array/matrix, should a new block (bn), if at all be placed; more pertinently, which edge of the new block should be adjacent to which edge of an already existing block, in the first n-dimensional array/matrix (500) is determined.

In at least an embodiment, the 'intelligent mapping' and the 'intelligent locating' is done as follows:

doping, by way of correlating via spatial extrapolation, in terms of strengths of association, of said fifth vector (5V) to at least one of said first vector (1V), said second vector (2V), and said third vector (3V) which gives an output (data item) which is beyond outer threshold of at least one of said first vector (1V), said second vector (2V), and said third vector (3V) of a first block but not within inner threshold of at least one of said first vector (1V), said second vector (2V), and said third vector (3V) of an adjacent second block, the first block and the second block sharing at least a common edge defined at least by one of said first vector (1V), said second vector (2V), and said third vector (3V); the output (data item) now has to be placed in a new block between said first block and said second block such that the betweenness is defined by:

at least one common edge defined at least by a vector selected from one of said first vector (1V), said second vector (2V), and said third vector (3V), the selection of commonality of one of more edges being defined by checking for truth models, to check if:

the truth value of said fifth vector (5V) affects at least a first vector (1V) to be pushed out of scope of predefined ranges of first block and second block;

the truth value of said fifth vector (5V) affects at least a second vector (2V) to be pushed out of scope of predefined ranges of first block and second block; and/or the truth value of said fifth vector (5V) affects at least a third vector (3V) to be pushed out of scope of predefined ranges of first block and second block.

In sum, a bias vector value (5V) is checked against a first n-dimensional array's/matrix's (500) block's edges (1V, 2V, 3V) in order to output where, in a 3-dimensional array/matrix, should a new block (bm), if at all be placed; more pertinently, which edge of the new block should be adjacent to which edge of an already existing block, in the first n-dimensional array/matrix (500) is determined.

In at least an embodiment, there is a system configured with an ever expanding, self-calibrating, array/matrix/database of one or more types of attributes, said system comprising:

defining a first n-dimensional attribute array (500) having a plurality of a first set of blocks (b1, b2, b3, b4, b5, b6, b7, b8, b9), each block, from the first set of blocks, having a first type of data item resident, in that, each of said first set of blocks being defined, in terms of one or more dimensions (1V, 2V, 3V) correlating to a first set of attributes, each dimension correlative to at least a vector, each attribute, vide its vector, having a scalar range defined by an upper threshold value (ut) and a lower threshold value (lt), in that, at least a first dimension, of each block, of said n-dimensional attribute array, corresponding to a first attribute, corresponding to a first vector (1V);

at least a second dimension, of each block, of said n-dimensional attribute array, corresponding to a second attribute, corresponding to a second vector (2V);

at least a third dimension, of each block, of said n-dimensional attribute array, corresponding to a third attribute, corresponding to a third vector (3V);

each of said first type of data items being defined, in terms of one or more first set of attributes, defining a second n-dimensional identity array (700) having a plurality of second set of blocks (z1, z2, z3, z4, 75, z6, z7, z8, z9), each block, from the second set of blocks, having a second type of data item resident, in that, each of said second set of blocks being defined, in terms of one or more dimensions, correlating to a second set of attributes, each dimension correlative to at least a vector, each attribute, vide its vector, having a scalar range defined by an upper threshold value (ut) and a lower threshold value (lt), in that, at least a first dimension, of each block, from said second set of blocks, of said n-dimensional identity array, corresponding to a fourth attribute, corresponding to a fourth vector (4V);

at least a second dimension, of each block, from said second set of blocks, of said n-dimensional array, corresponding to a fifth attribute, corresponding to a fifth vector (5V);

each of said second type of data items being defined, in terms of one or more second set of user attributes, determining spatial extrapolation, in terms of strengths of association, between at least one of said fourth vector (4V) and said fifth vector (5V) and at least one of said first vector (1V), said second vector (2V), and said third vector (3V) in a pre-defined range, said determination leading to a correlation between said first n-dimensional attribute array (500) and said second n-dimensional attribute array (700);

creating a modified n-dimensional array, based on said first n-dimensional array (500) by polling data from said second n-dimensional array (700), said modified n-dimensional array being created by:

intelligently mapping each of said new second type of data items, in a corresponding new block, of said modified n-dimensional array, of said first n-dimensional array (500), in that, said new block being defined by:

said new first type of data item such that said spatial extrapolation, in terms of strengths of association determines that its scalar value does not fit within any pre-defined scalar range;

said new first type of data item such that said spatial extrapolation, in terms of strengths of association, between at least one of said fourth vector (4V) and said fifth vector (5V) and at least one of said first vector (1V), said second vector (2V), and said third vector (3V) is in a pre-defined range;

intelligently locating each of said new first type of data items, in said new block of said modified n-dimensional attribute array, in that, said new block being placed at a location such that there is at least one common edge between at least one vector selected from said first vector (1V), said second vector (2V), and said third vector (3V); and/or said new block being placed at a location such that there is at least one common edge between at least one vector selected from said fourth vector (4V), and said fifth vector (5V); and/or said new block being placed at a location such that its scalar range fits within two previously-adjacent edges of blocks of said first n-dimensional array.

Let C be a set of all available shades/colors having an RGB vector. Let the cardinality of this set be n. So colors will go from C1, C2, . . . , Cn Let there be users of m types of skin color(S). So, skin types are S1, S2, . . . , Sm.

Let expert/machine recommendation be the set R. These recommendations may be for lips, skin etc. depending on UUP (USB+ULB) and UPP [FIG. 5]. Let <uup> represent a row vector consisting of all unique user profile attributes and <upp> represent a row vector of unique product profile attributes. Let E be the set of x experts. So experts will go on from E1, E2, . . . , Ex.

Here, the recommendation is a color recommendation, which will be a RGB vector. In the first version of the problem, the recommendation will come from the set of colors C. This will act as the initial prediction model. The recommendation made by this approach reduces the problem to a classification problem.

With this data, the system and method, of this invention, creates a table of available recommendations with expert biases (4V, 5V) as:

<uup>1|<upp>1|E1|→C2

<uup>4|<upp>2|E5|→C10

. . . And so on.

This data creates the base model/initial prediction model, by building databases (the n-dimensional arrays) required for a recommendation engine.

For a recommendation that gives a new color, which is not in the set of original colors C (i.e. the first n-dimensional array (500)), the system and method, of this invention, applies regression and predict a new color (a new data item for a new block). For this, the system and method, of this invention, uses a gradient boosting algorithm (XGBoost) that starts with an initial data set (i.e. the first n-dimensional array (500)) and an initial prediction and calculate the residuals basis the biases (i.e. the second n-dimensional array (700)).

From the residuals, the system and method, of this invention builds a gradient boosted tree by doing the following steps:

calculate similarity scores for nodes/edges. Formula is sum of residuals squared/no. of residuals+regularization param.

Calculate Information gain. Gain=Sum of similarity scores of children−similarity score of root.

This is done to continuously split the data along individual attributes and choosing the split that provides the maximum gain value. Hence, gain determines how the system and method, of this invention splits the data.

To reduce the tree complexity, the system and method, of this invention prunes the tree by using a tree complexity param (gamma). The system and method, of this invention take the difference between gain and gamma. If difference is negative, the system and method, of this invention prunes the tree and if it is positive, the system and method, of this invention does not prune the tree.

After the entire process is done and the system and method, of this invention outputs a final tree, it calculates output values by plugging in the formula:

initial prediction+learning_rate*similarity_score for each node.

The main idea behind grad boosted trees is that, during the training phase, many trees are constructed using the features (columns) of the dataset. Each of these trees are called weak learners and with each weak learner, training proceeds to build the next tree that will hv some info gain and optimal tree splits to achieve the loss function minimization. In this iterative way, a final trained tree is built that will be used for prediction.

The final prediction formula is basis the information gains achieved at each step and which features contributed to max gains. This is called feature importance. 2 main methods to calculate feature importance are F score: this is number of times a feature is used to split the data across all the trees (learners). This is also called weights. Higher score of features shows the influence on the output.

Gain: avg gain of the feature across the trees. This lists the feature according to the info gain it provides to the learners.

These scores and feature importance changes with data and new feature inclusions in subsequent trainings.

SHAP values are also used to interpret the feature importance but first 2 methods are more commonly used.

Multi regression to predict RGB vectors:

<uup>1<upp>→<RGB> uup→skin tone bucket, skin tone RGB, user responses etc.

upp→product composition, RGB of product etc.

Each parameter taken and gradient boosting is used to predict target RGD values.

Here, the system and method, of the invention, uses XGBoost and the process is as follows:

Dataset is $\{x_i, y_i\}_{i=1}^n$ where $x_i$ is <uup> vector concatenated with <upp> vector and $y_i$ is corresponding RGB vector.

STEP 1: Let L be a differentiable loss function.

$L(y_i, F(x))$ and $(F(x)=Pi)$ where F(x) is prediction function.

For simplicity, the system and method, of this invention, picks $$L2 \text{ loss function} = \sum_{1}^{n} \frac{1}{2}(yi - F(x))2$$

Initialise model with Fo(x)—average of observed vector values.

STEP 2: Fo(x) is the initial prediction basis which similarity scores are to be calculated.

Main goal here is to minimise the following equation:

$$\left[\sum_{1}^{n} L(yi, Pi)\right] + \frac{1}{2}\lambda O_{value}^2$$

where λ=regularization parameter
$O_{value}$=output value for the leaf that minimised the whole equation above.

The system and method, of this invention, defines gradient as:

$$g_i = \frac{d}{dP_i}\frac{1}{2}(y_i - P_i)^2 = -(y_i - P_i)$$

The system and method, of this invention, defines Hessian as:

$$h_i = \frac{d^2}{dP_i^2}\frac{1}{2}(y_i - P_i)^2 = \frac{d}{dp_i} - (y_i - P_i) = 1$$

Using above definitions and using Taylor Series approximation (2nd order Taylor Polynomial) for the minimization function, it can be shows that:

$$O_{value} = \left[\left(\sum g_i\right) \div \left(\sum h_i + \lambda\right)\right] = \left(\sum \text{residuals}\right) / \left(no. \text{ d-residuals} + \lambda\right)$$

Similarity Score is defined as:

$$O_{value} =$$
$$1/2\left[\left(\sum g_i\right)^2 \div \left(\sum h_i + \lambda\right)\right] = \left(\sum \text{residuals}\right)2 / \left(no. \text{ d-residuals} + \lambda\right)$$

In XGB it is without ½ scaling

This system's XGB builds trees to minimise main equation and as it builds the trees starting at root node, it selects trees based on grain at each level.
Gain at a Level 1—'Similarity of Left Arm+Right Arm— Root Similarity (Parent)

STEP 3: Once a tree is built, new prediction id done by initial prediction+learning rate X output value calculated for a leaf node. This is done for each observation until residuals are minimized or maximum iterations are reached.

STEP 4: New observation goes through prediction process to give an output value

The following paragraphs disclose spatial extrapolation in terms of strengths of association:

In at least an embodiment, biasing of first type of data items [i.e. user attributes (user skin profile parameters and user lifestyle profile parameters) on second type of data items [i.e. product profile (e.g. colour vector parameter)] is taken is computed. For this, after the training tree is built for the dataset, the strength of association with the output (product profile, RGB color in this case) is established by similarity scores and optimal tree splits are achieved by the training process.

According to a non-limiting exemplary embodiment, if skin tone is T1, and target price point is economy (<1000) and target product is lipstick, then output color code is R1, G1, and B1, which may be available in the set of available color codes. But for another example, if skin tone changes to T2, it has an effect on the output color code and the system gives R1, G2, B1. For simplicity, in this exemplary embodiment, a case is taken where the system has only changed 1 parameter in the RGB vector. This color vector (R1, G2, B1) may not exist in the available set of products and hence shows that with thorough training, the system is able to extrapolate an output (by providing a biased new data item) basis numerical importance it has given to each of the parameters. (skin tone in this example).

Figure 12:
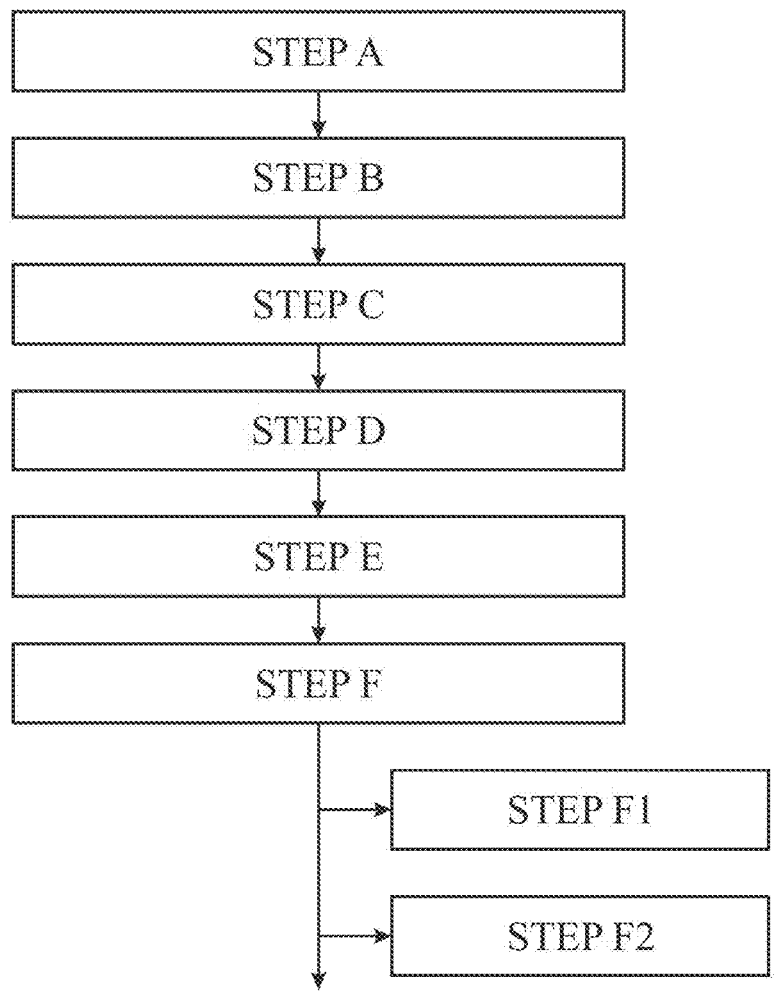
FIG. 12 illustrates a flowchart for the system and method of this invention.

FIG. 12 illustrates a flowchart for the system and method of this invention.

STEP A: Establish a request to poll first set of attributes, each attribute having a vector (1V, 2V, 3V) and a range (ut, lt) of scalar values;

STEP B: Defining a first n-dimensional attribute array (500) having a plurality of a first set of blocks (b1, b2, b3, b4, b5, b6, b7, b8, b9), each block, from the first set of blocks, having a first type of data item resident, the data item correlative to the polled first set of attributes;

STEP C: Establish a request to poll second set of attributes, each attribute having a vector (4V, 5V, 6V) and a range (ut, lt) of scalar values;

STEP D: Defining a second n-dimensional attribute array (700) having a plurality of a second set of blocks (z1, z2, z3, z4, 75, z6, z7, z8, z9), each block, from the second set of blocks, having a second type of data item resident, the data item correlative to the polled second set of attributes;

STEP E: Establish a request to correlate polled first set of attributes with polled second set of attributes;

STEP F: Creating a modified n-dimensional array basis correlated values and determining requirement of new blocks, the modified n-dimensional array with new blocks, being created by:

STEP F1: intelligently mapping the new blocks in terms of scalar values by checking ranges;

STEP F2: intelligently locating the new blocks in terms of vector values by checking edges.

Furthermore, the system and method, of this invention, provides a system and method which matches a user's perceived look and/or attribute(s) with a product's actual attribute(s). In other words, there is a provided a system and method which predicts the gap between a user's actual look attributes and a buyer's perceived look attributes and, furthermore, predicts a product's described attribute(s) and a product's actual performance-based attribute(s) and, additionally, predicts a user's (who has used a product) perceived look attribute(s), perceived product attribute(s), the user's actual look attribute(s), and the actual product attribute(s).

The TECHNICAL ADVANCEMENT of this invention lies in providing a system configured with an ever expanding, self-calibrating, array/matrix of one or more types of attributes. In order to achieve this, datasets need to be built which segment data items in terms of attributes (vector+ scalar), use biases to dope this segmented data items by external data items (biases), see how the biases' data items affect segments of the segmented data items-thereby, forming new data items, intelligently map the formed new data items correlative to the segmented data items, and intelligently located the formed new data items correlative to the segmented data items.

DISCLAIMERS AND EXPLANATIONS

Additionally, as noted herein, one or more modules, elements or components described in connection with embodiments of the invention can be located geographically-remote from one or more other modules, elements or components. That is, for example, the modules, elements or components shown and described in the context of the figures can be distributed in an Internet-based environment, a mobile telephony-based environment, a kiosk-based environment and/or a local area network environment. Depending on the operations being performed by the system, one implementation environment may have some functional and/or physical benefits over another implementation environment.

Consistent with the present disclosure, the methods and processes disclosed herein may be performed by the networked server (150) as a result of (processor (202) executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

The components and arrangements, shown in the figures, are not intended to limit the disclosed embodiments. As will be appreciated by a person skilled in the art having the benefit of this disclosure, numerous variations and/or modifications may be made to the depicted configuration of server (150). For example, not all components may be essential for the operation of server (150) in all cases. Any component may be located in any appropriate part of server (150), and the components may be rearranged into a variety of configurations while providing the functionality of the disclosed embodiments. For example, some servers may not include some of the elements shown in I/O system.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be appreciated that combinations of the different implementation environments are contemplated as being within the scope of embodiments of the invention. One of ordinary skill in the art will realize alternative implementations given the illustrative teachings provided herein.

In some embodiments, the digital images may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital images may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combinations.

The data, in each of the components of the system and method may be 'encrypted' and suitably 'decrypted' when required.

The systems described herein can be made accessible through a portal or an interface which is a part of, or may be connected to, an internal network or an external network, such as the Internet or any similar portal. The portals or interfaces are accessed by one or more of users through an electronic device, whereby the user may send and receive data to the portal or interface which gets stored in at least one memory device or at least one data storage device or at least one server, and utilises at least one processing unit. The portal or interface in combination with one or more of memory device, data storage device, processing unit and serves, form an embedded computing setup, and may be used by, or used in, one or more of a non-transitory, computer readable medium. In at least one embodiment, the embedded computing setup and optionally one or more of a non-transitory, computer readable medium, in relation with, and in combination with the said portal or interface forms one of the systems of the invention. Typical examples of a portal or interface may be selected from but is not limited to a website, an executable software program or a software application.

The systems and methods may simultaneously involve more than one user or more than one data storage device or more than one host server or any combination thereof.

A user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick.

The systems and methods can be practiced using any electronic device which may be connected to one or more of other electronic device with wires or wirelessly which may use technologies such as but not limited to, Bluetooth, WiFi, Wimax. This will also extend to use of the aforesaid technologies to provide an authentication key or access key or electronic device based unique key or any combination thereof.

In at least one embodiment, one or more user can be blocked or denied access to one or more of the aspects of the invention.

Encryption can be accomplished using any encryption technology, such as the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content can be performed in accordance with any technology including utilizing an encryption algorithm. The encryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "non-transitory, computer readable medium", where a processor may read and execute the code from the non-transitory, computer readable medium. A non-transitory, computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory, computer readable medium at the receiving and transmitting stations or devices. An "article of manufacture" comprises non-transitory, computer readable medium or hardware logic, and/or transmission signals in which code may be implemented. A device in which the code implementing the described embodiments of operations is encoded may comprise a non-transitory, computer readable medium or hardware logic. Of course, those skilled in the art will recognize that many modifications may be made to this configuration without departing from the scope of the present invention, and that the article of manufacture may comprise suitable information bearing medium known in the art.

The term network means a system allowing interaction between two or more electronic devices, and includes any form of inter/intra enterprise environment such as the world wide web, Local Area Network (LAN), Wide Area Network (WAN), Storage Area Network (SAN) or any form of Intranet.

The systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, tablet computers, mobile phones, laptop computers, palmtops, portable media players, and personal digital assistants. In an embodiment, the computer readable medium data storage unit or data storage device is selected from a set of but not limited to USB flash drive (pen drive), memory card, optical data storage discs, hard disk drive, magnetic disk, magnetic tape data storage device, data server and molecular memory.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further', some steps may be performed simultaneously, in parallel, or concurrently.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A computer-implemented method, caused by a server, for creating an ever-expanding, self-calibrating, array of one or more types of attributes, the method comprising:

defining a first n-dimensional attribute array having a plurality of a first set of blocks, each block being a memory cell on the server configured to store data items as bits in the memory cell, and each block, from the first set of blocks, having a first type of data item resident, in that, each of the first set of blocks being defined, in terms of one or more dimensions correlating to a first set of attributes, each dimension correlative to a vector, each attribute, vide its vector, having a scalar range defined by an upper threshold value and a lower threshold value, in that, a first dimension, of each block, of the n-dimensional attribute array, corresponding to a first attribute, corresponding to a first vector;

a second dimension, of each block, of the n-dimensional attribute array, corresponding to a second attribute, corresponding to a second vector;

a third dimension, of each block, of the n-dimensional attribute array, corresponding to a third attribute, corresponding to a third vector;

each of the first type of data items being defined, in terms of one or more first set of attributes, defining a second n-dimensional identity array having a plurality of second set of blocks, each block, from the second set of blocks, having a second type of data item resident, in that, each of the second set of blocks being defined, in terms of one or more dimensions, correlating to a second set of attributes, each dimension correlative to a vector, each attribute, vide its vector, having a scalar range defined by an upper threshold value and a lower threshold value, in that, a first dimension, of each block, from the second set of blocks, of the n-dimensional identity array, corresponding to a fourth attribute, corresponding to a fourth vector;

a second dimension, of each block, from the second set of blocks, of the n-dimensional array, corresponding to a fifth attribute, corresponding to a fifth vector;

each of the second type of data items being defined, in terms of one or more second set of user attributes, determining spatial extrapolation, in terms of strengths of association, between at least one of the fourth vector and the fifth vector and at least one of the first vector, the second vector, and the third vector in a pre-defined range, the determination leading to a correlation between the first n-dimensional attribute array and the second n-dimensional attribute array;

creating a modified n-dimensional array, based on the first n-dimensional array by polling data from the second n-dimensional array, the modified n-dimensional array being created by:

intelligently mapping each of the new second type of data items, in a corresponding new block, of the modified n-dimensional array, of the first n-dimensional array, in that, the new block being defined by:

the new first type of data item such that the spatial extrapolation, in terms of strengths of association determines that its scalar value does not fit within any pre-defined scalar range;

the new first type of data item such that the spatial extrapolation, in terms of strengths of association, between at least one of the fourth vector and the fifth vector and at least one of the first vector, the second vector, and the third vector is in a pre-defined range;

intelligently locating each of the new first type of data items, in the new block of the modified n-dimensional attribute array, in that, the new block being placed at a location such that there is at least one common edge between at least one vector selected from the first vector, the second vector, and the third vector; and/or the new block being placed at a location such that there is at least one common edge between at least one vector selected from the fourth vector, and the fifth vector; and/or the new block being placed at a location such that its scalar range fits within two previously-adjacent edges of blocks of the first n-dimensional array; and providing the intelligently located new first type of data items to a user of the server.

2. The method as claimed in claim 1 wherein, a first dimension, of each block, from the first set of blocks, of the first n-dimensional attribute array, corresponding to a first product attribute, having a first product range in terms of first vectors.

3. The method as claimed in claim 1 wherein, a second dimension, of each block, from the first set of blocks, of the first n-dimensional attribute array, corresponding to a second product attribute, having a second product range in terms of second vectors.

4. The method as claimed in claim 1 wherein, a second dimension, of each block, from the first set of blocks, of the first n-dimensional attribute array, corresponding to a third product attribute, having a third product range in terms of third vectors.

5. The method as claimed in claim 1 wherein, each of the product data items being defined, in terms of one or more product attributes, in that, a first product attribute is correlative to product formulation;

a second product attribute is correlative to product price; and a third product attribute is correlative to product application.

6. The method as claimed in claim 1 wherein, a first dimension, of each block, of the second n-dimensional identity array, corresponds to a first user attribute, having a first user range in terms of fourth vectors.

7. The method as claimed in claim 1 wherein, a second dimension, of each block, of the second n-dimensional identity array, corresponds to a second user attribute, having a first user range in terms of fifth vectors.

8. The method as claimed in claim 1 wherein, each of the user data items being defined, in terms of one or more user attributes, in that, a first fixed user attribute correlates to the user's fixed attributes; and a second variable attribute correlates to the user's variable attributes.

9. The method as claimed in claim 1 wherein, the steps of intelligently locating and intelligently mapping, further comprising the steps of:

doping, by way of correlating via spatial extrapolation, in terms of strengths of association, of the fourth vector to at least one of the first vector, the second vector, and the third vector which gives an output which is beyond outer threshold of at least one of the first vector, the second vector, and the third vector of a first block but not within inner threshold of at least one of the first vector, the second vector, and the third vector of an adjacent second block, the first block and the second block sharing a common edge defined at least by one of the first vector, the second vector, and the third vector; the output now has to be placed in a new block between the first block and the second block such that the betweenness is defined by:

a common edge defined by a vector selected from one of the first vector, the second vector, and the third vector, the selection of commonality of one of more edges being defined by checking for truth models, to check if:

the truth value of the fourth vector affects a first vector to be pushed out of scope of predefined ranges of first block and second block;

the truth value of the fourth vector affects a second vector to be pushed out of scope of predefined ranges of first block and second block; and/or the truth value of the fourth vector affects a third vector to be pushed out of scope of predefined ranges of first block and second block.

10. The method as claimed in claim 1 wherein, the steps of intelligently locating and intelligently mapping, further comprising the steps of:

doping, by way of correlating via spatial extrapolation, in terms of strengths of association, of the fifth vector to at least one of the first vector, the second vector, and the third vector which gives an output which is beyond outer threshold of at least one of the first vector, the second vector, and the third vector of a first block but not within inner threshold of at least one of the first vector, the second vector, and the third vector of an adjacent second block, the first block and the second block sharing a common edge defined at least by one of the first vector, the second vector, and the third vector; the output now has to be placed in a new block between the first block and the second block such that the betweenness is defined by:

a common edge defined by a vector selected from one of the first vector, the second vector, and the third vector, the selection of commonality of one of more edges being defined by checking for truth models, to check if:

the truth value of the fifth vector affects a first vector to be pushed out of scope of predefined ranges of first block and second block;

the truth value of the fifth vector affects a second vector to be pushed out of scope of predefined ranges of first block and second block; and/or the truth value of the fifth vector affects a third vector to be pushed out of scope of predefined ranges of first block and second block.

11. The method as claimed in claim 1 wherein, the steps of intelligently locating and intelligently mapping, further comprising the steps of:

receiving a new data item with first set of attributes;

checking if the received new data item can reside on an existing block, already a part of the first n-dimensional array/matrix, based on lower threshold value and upper threshold value or whether it warrants creation of a new block if the values lie in the non-contiguous portion/s of the already-defined threshold values of the already-defined blocks of the first n-dimensional array/matrix.

12. The method as claimed in claim 1 wherein, the steps of intelligently locating and intelligently mapping, further comprising the steps of:

receiving a new data item with second set of attributes;

checking if the received new data item can reside on an existing block, already a part of the second n-dimensional array/matrix, based on lower threshold value and upper threshold value or whether it warrants creation of a new block if the values lie in the non-contiguous portion/s of the already-defined threshold values of the already-defined blocks of the first n-dimensional array/matrix.

13. The method as claimed in claim 1 wherein, adjacent blocks of the first n-dimensional array being non-contiguous in terms of vectorized magnitudes, in that, a lower threshold value, of a first dimension, of a block does not start where the upper threshold value, of a first dimension, of a block ends.

14. The method as claimed in claim 1 wherein, the first n-dimensional array/matrix having blocks;

each block comprising data items;

each block comprising edges representing dimensions vide vectorized directions, in turn, representing attributes correlative to the stored data items; and each edge comprising a lower threshold value and an upper threshold value, the threshold values representing boundaries for the data items on the respective block vide vectorized magnitudes, in turn representing weights correlative to the stored data items.

15. The method as claimed in claim 1 wherein, the second n-dimensional array/matrix having blocks;

each block comprising data items;

each block comprising edges representing dimensions vide vectorized directions, in turn, representing biases correlative to the stored data items; and each edge comprising a lower threshold value and an upper threshold value, the threshold values representing boundaries for the data items on the respective block vide vectorized magnitudes, in turn representing weights correlative to the stored data items.

16. A system comprising:

one or more processors; and a non-transitory computer-readable medium or media comprising one or more sequences of instructions which, when executed by the one or more processors, causes steps to be performed comprising:

defining a first n-dimensional attribute array having a plurality of a first set of blocks, each block being a memory cell on the server configured to store data items as bits in the memory cell, and each block, from the first set of blocks, having a first type of data item resident, in that, each of the first set of blocks being defined, in terms of one or more dimensions correlating to a first set of attributes, each dimension correlates to a vector, each attribute, vide its vector, having a scalar range defined by an upper threshold value and a lower threshold value, in that, a first dimension, of each block, of the n-dimensional attribute array, corresponding to a first attribute, corresponding to a first vector;

a second dimension, of each block, of the n-dimensional attribute array, corresponding to a second attribute, corresponding to a second vector;

a third dimension, of each block, of the n-dimensional attribute array, corresponding to a third attribute, corresponding to a third vector;

each of the first type of data items being defined, in terms of one or more first set of attributes, defining a second n-dimensional identity array having a plurality of second set of blocks, each block, from the second set of blocks, having a second type of data item resident, in that, each of the second set of blocks being defined, in terms of one or more dimensions, correlating to a second set of attributes, each dimension correlates to a vector, each attribute, vide its vector, having a scalar range defined by an upper threshold value and a lower threshold value, in that, a first dimension, of each block, from the second set of blocks, of the n-dimensional identity array, corresponding to a fourth attribute, corresponding to a fourth vector;

a second dimension, of each block, from the second set of blocks, of the n-dimensional array, corresponding to a fifth attribute, corresponding to a fifth vector;

each of the second type of data items being defined, in terms of one or more second set of user attributes, determining spatial extrapolation, in terms of strengths of association, between one of the fourth vector and the fifth vector and one of the first vector, the second vector, and the third vector in a pre-defined range, the determination leading to a correlation between the first n-dimensional attribute array and the second n-dimensional attribute array;

creating a modified n-dimensional array, based on the first n-dimensional array by polling data from the second n-dimensional array, the modified n-dimensional array being created by:

intelligently mapping each of the new second type of data items, in a corresponding new block, of the modified n-dimensional array, of the first n-dimensional array, in that, the new block being defined by:

the new first type of data item such that the spatial extrapolation, in terms of strengths of association determines that its scalar value does not fit within any pre-defined scalar range;

the new first type of data item such that the spatial extrapolation, in terms of strengths of association, between at least one of the fourth vector and the fifth vector and at least one of the first vector, the second vector, and the third vector is in a pre-defined range;

intelligently locating each of the new first type of data items, in the new block of the modified n-dimensional attribute array, in that, the new block being placed at a location such that there is a common edge between at least one vector selected from the first vector, the second vector, and the third vector; and/or the new block being placed at a location such that there is a common edge between at least one vector selected from the fourth vector, and the fifth vector; and/or the new block being placed at a location such that its scalar range fits within two previously-adjacent edges of blocks of the first n-dimensional array, and providing the intelligently located new first type of data items to a user of a server operated by the processor and medium.

* * * * *